US009648249B2

(12) United States Patent
Sugawara et al.

(10) Patent No.: US 9,648,249 B2
(45) Date of Patent: May 9, 2017

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventors: Atsushi Sugawara, Yokohama (JP); Naoyuki Nakagawara, Tokyo (JP); Keita Nagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 14/540,821

(22) Filed: Nov. 13, 2014

(65) Prior Publication Data
US 2015/0138392 A1 May 21, 2015

(30) Foreign Application Priority Data

Nov. 20, 2013 (JP) ................................ 2013-240252
May 20, 2014 (JP) ................................ 2014-104495

(51) Int. Cl.
H04N 5/235 (2006.01)
(52) U.S. Cl.
CPC ......... H04N 5/2357 (2013.01); H04N 5/2351 (2013.01); H04N 5/2353 (2013.01)
(58) Field of Classification Search
CPC .... H04N 5/235; H04N 5/2351; H04N 5/2353; H04N 5/2357
See application file for complete search history.

(56) References Cited

U.S. PATENT DOCUMENTS

| 2006/0152598 A1* | 7/2006 | Kawarada | .......... H04N 5/23248 348/226.1 |
| 2011/0032989 A1* | 2/2011 | Seki | .................... H04N 5/2357 375/240.12 |
| 2011/0267506 A1* | 11/2011 | Klijn | .................... H04N 5/2357 348/241 |

FOREIGN PATENT DOCUMENTS

| JP | 06-209427 A | 7/1994 |
| JP | 2006-222935 A | 8/2006 |
| JP | 05157777 B2 | 3/2013 |

OTHER PUBLICATIONS

Aug. 26, 2016 Korean Office Action, issued in Korean Patent Application No. 10-2014-0162265.

* cited by examiner

Primary Examiner — Daniel M Pasiewicz
(74) Attorney, Agent, or Firm — Cowan, Liebowitz & Latman, P.C.

(57) ABSTRACT

An image capturing apparatus comprises an image capturing unit, a calculation unit configured to calculate light amount variation characteristics of light from an object, a photometric value determination unit configured to determine a photometry value used for determination of an exposure condition based on the light amount variation characteristics calculated by the calculation unit, and an exposure condition determination unit configured to determine an exposure condition when performing exposure of the image capturing unit at a timing set based on the light amount variation characteristics calculated by the calculation unit, based on the photometry value determined by the photometric value determination unit.

8 Claims, 28 Drawing Sheets

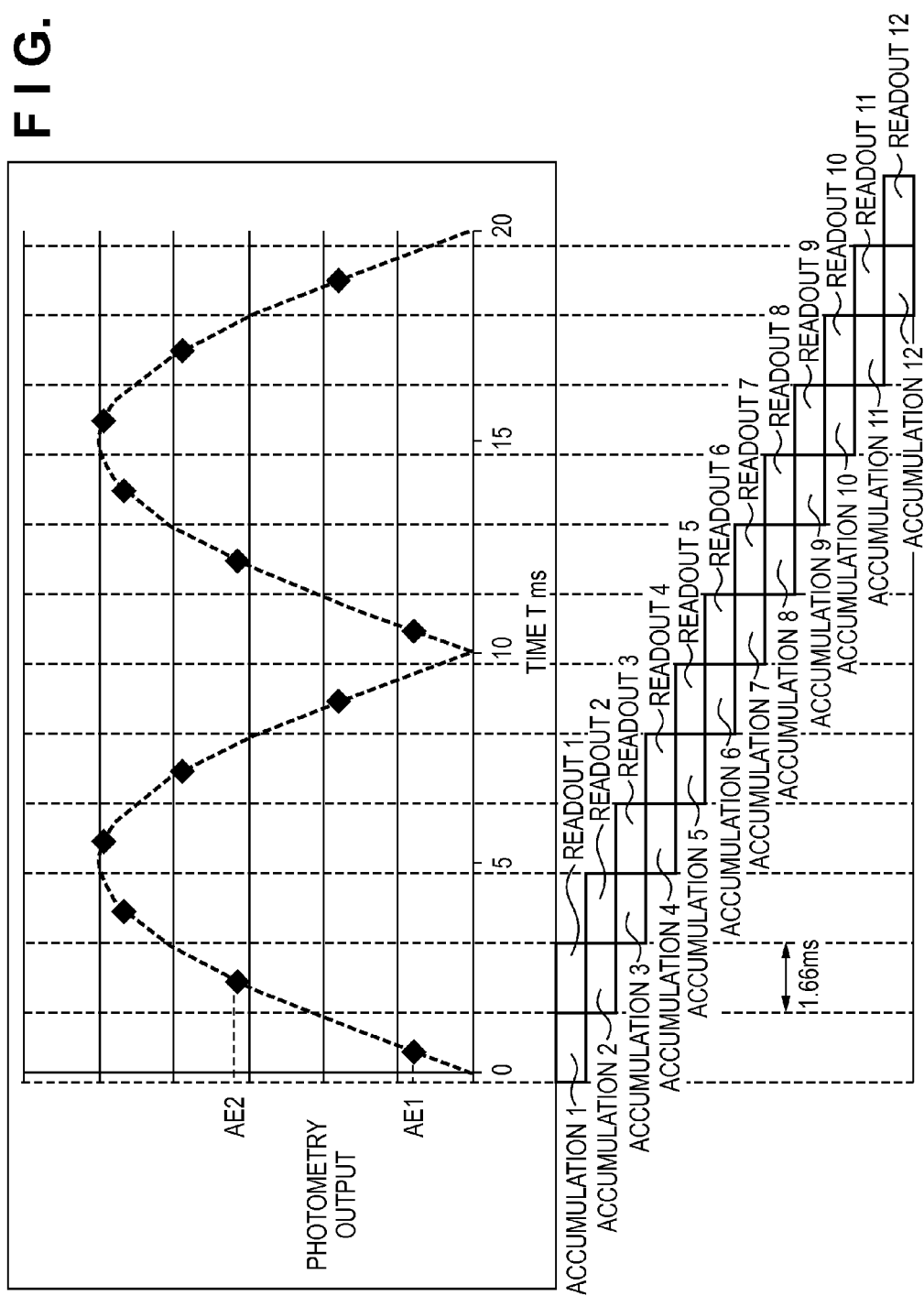

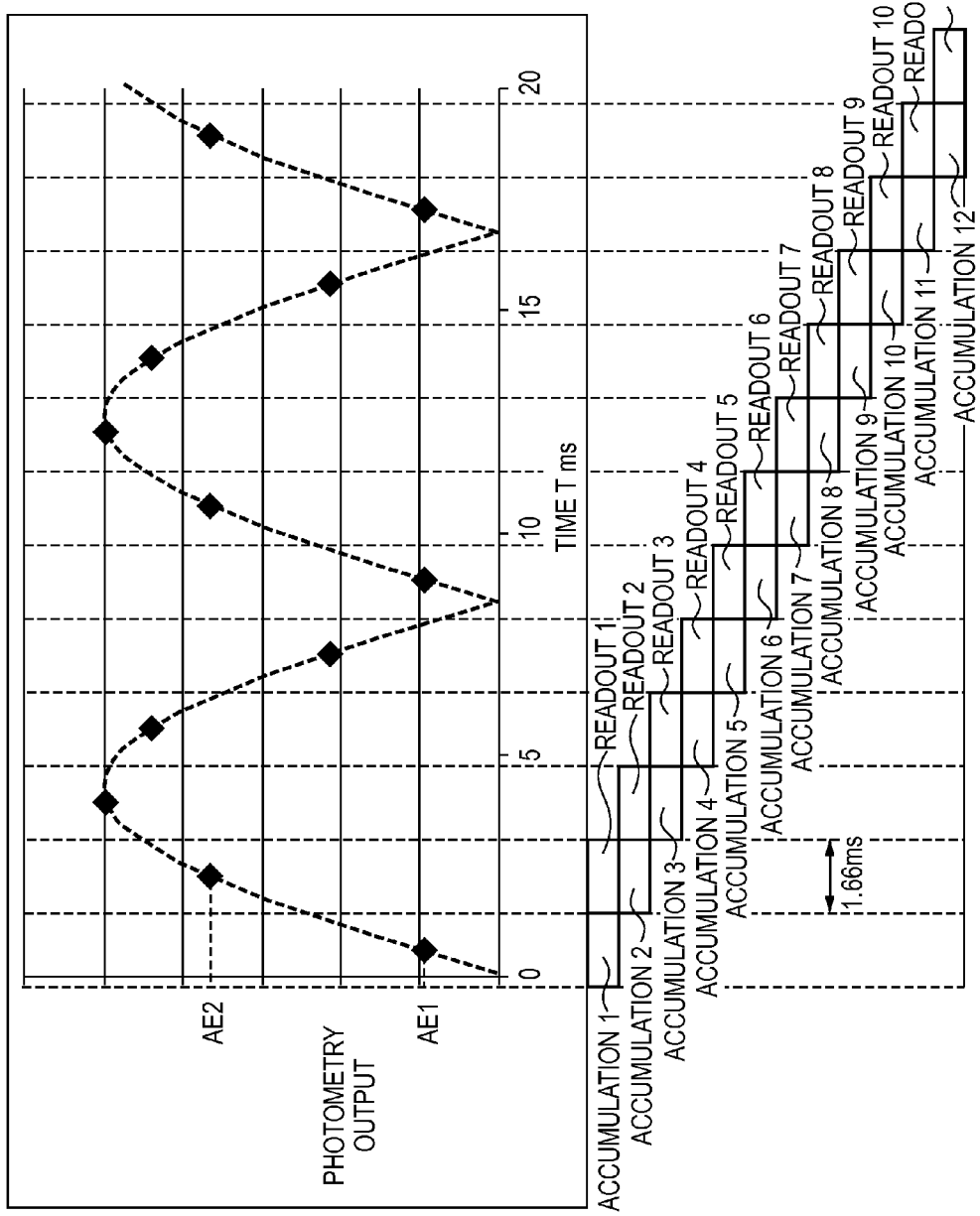

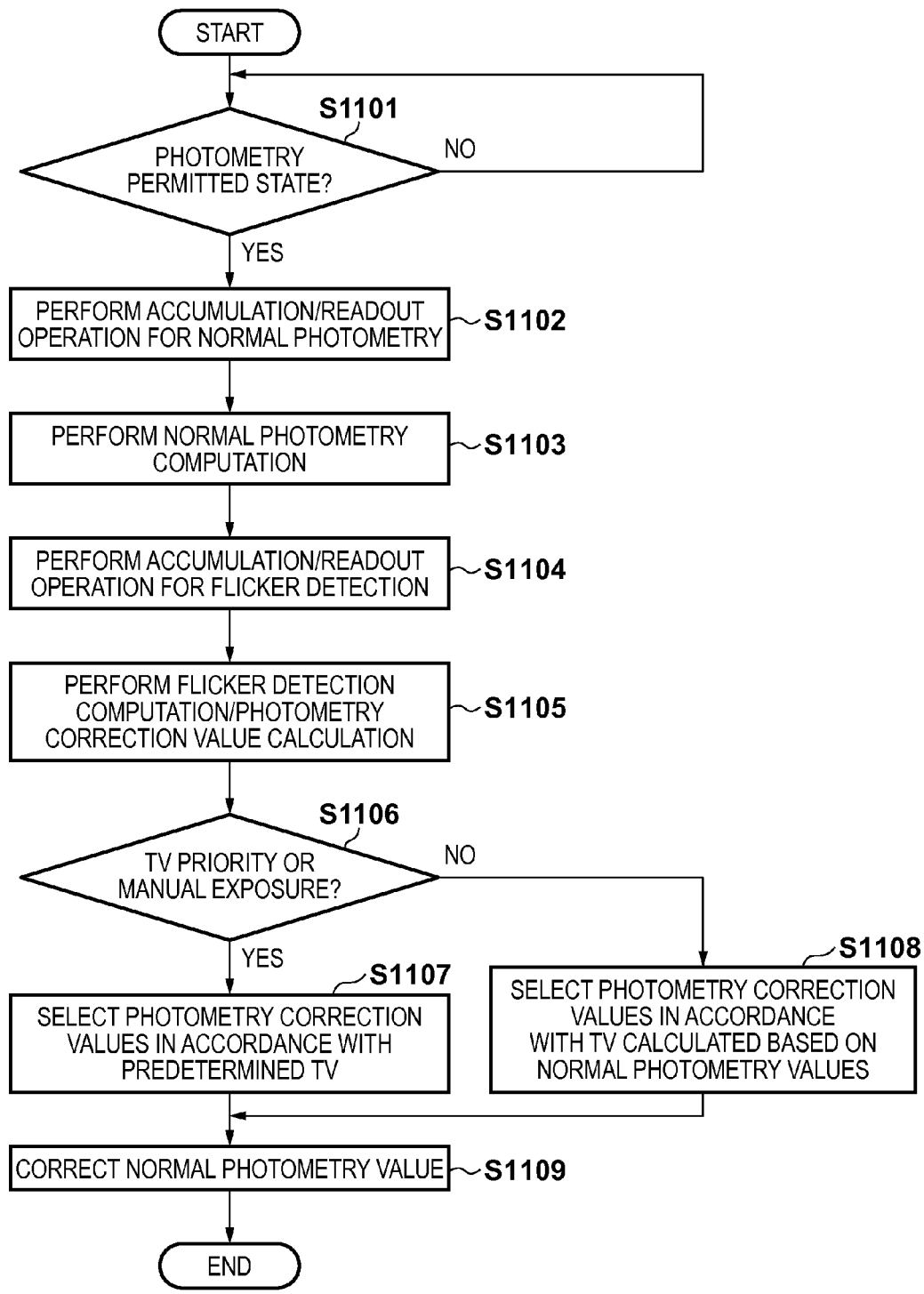

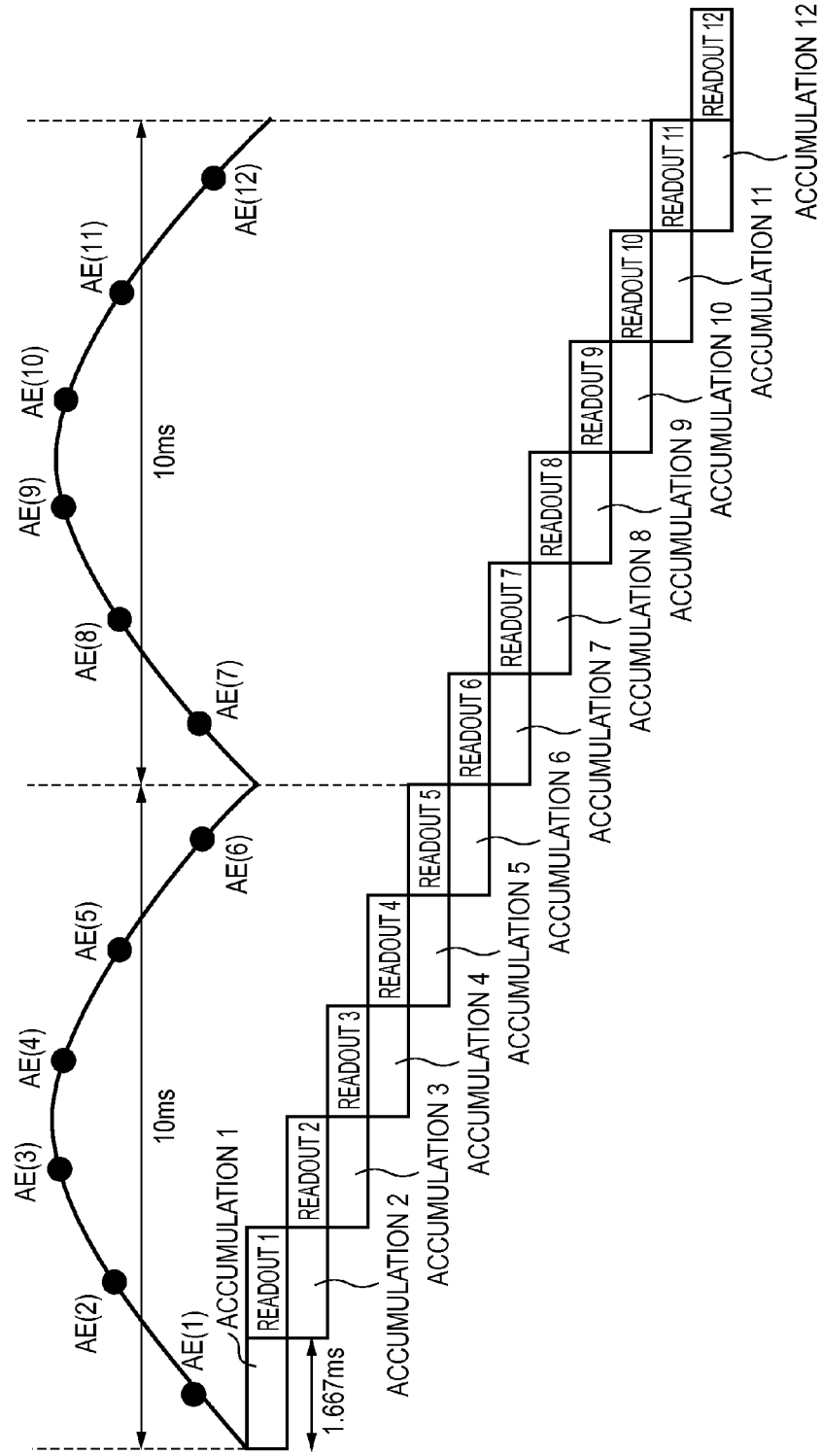

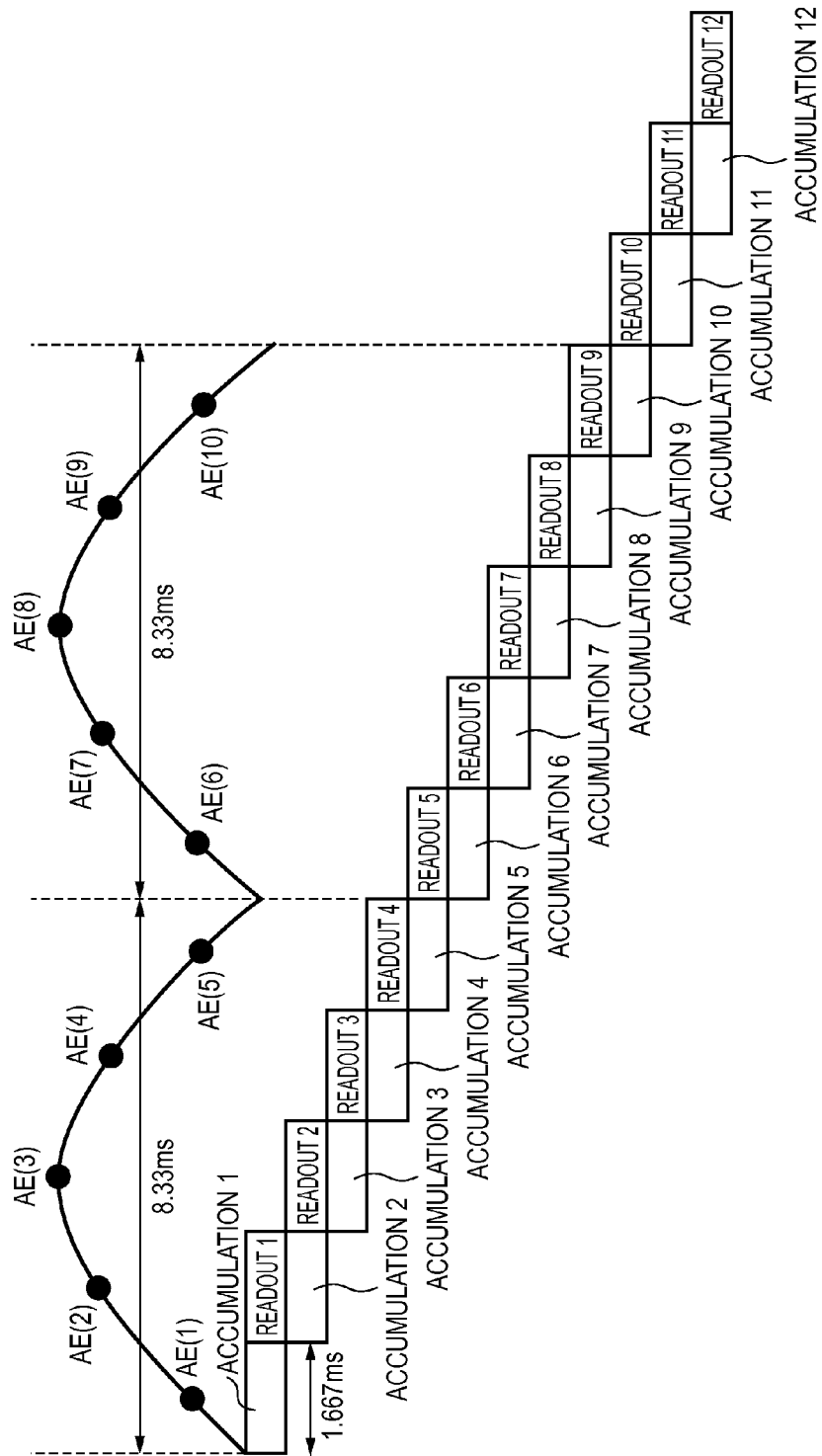

FIG. 9

| VERTICAL PIXEL ADDITION COUNT | READOUT TIME (1V TIME) |
|---|---|
| 1 (ALL PIXEL READOUT) | 6.25ms |
| 2 | 3.63ms |
| 3 | 2.75ms |
| 4 | 2.33ms |
| 5 | 2.09ms |
| 6 | 1.90ms |
| 7 | 1.81ms |
| 8 | 1.73ms |
| 9 | 1.66ms |
| 10 | 1.62ms |

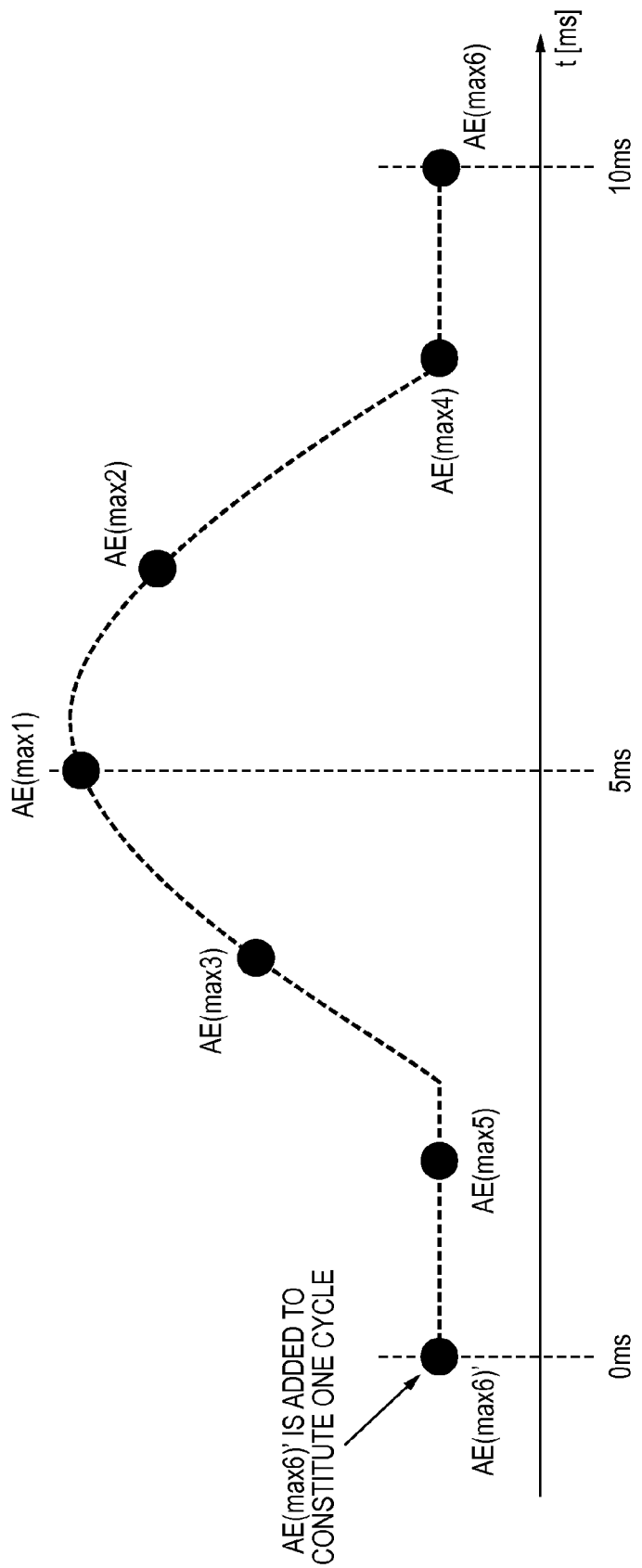

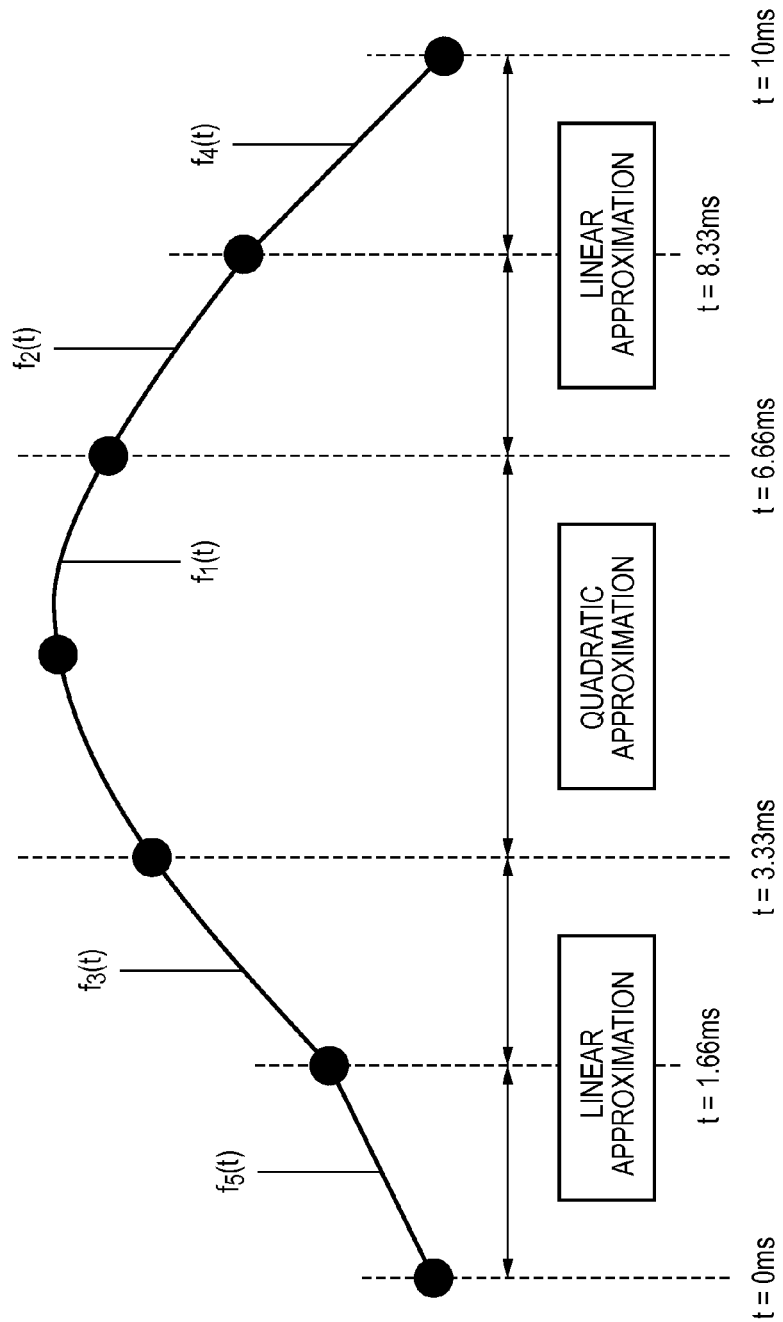

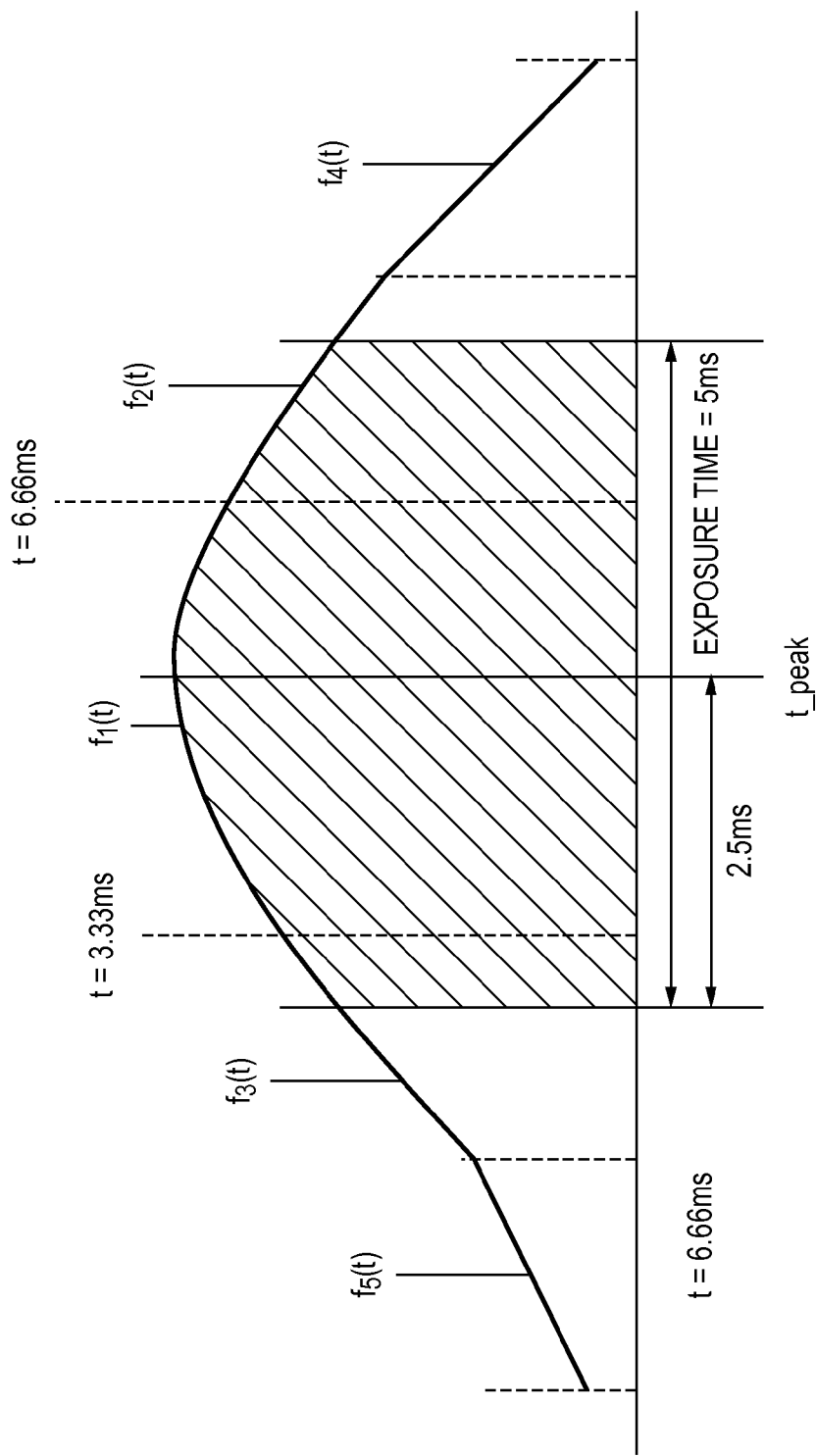

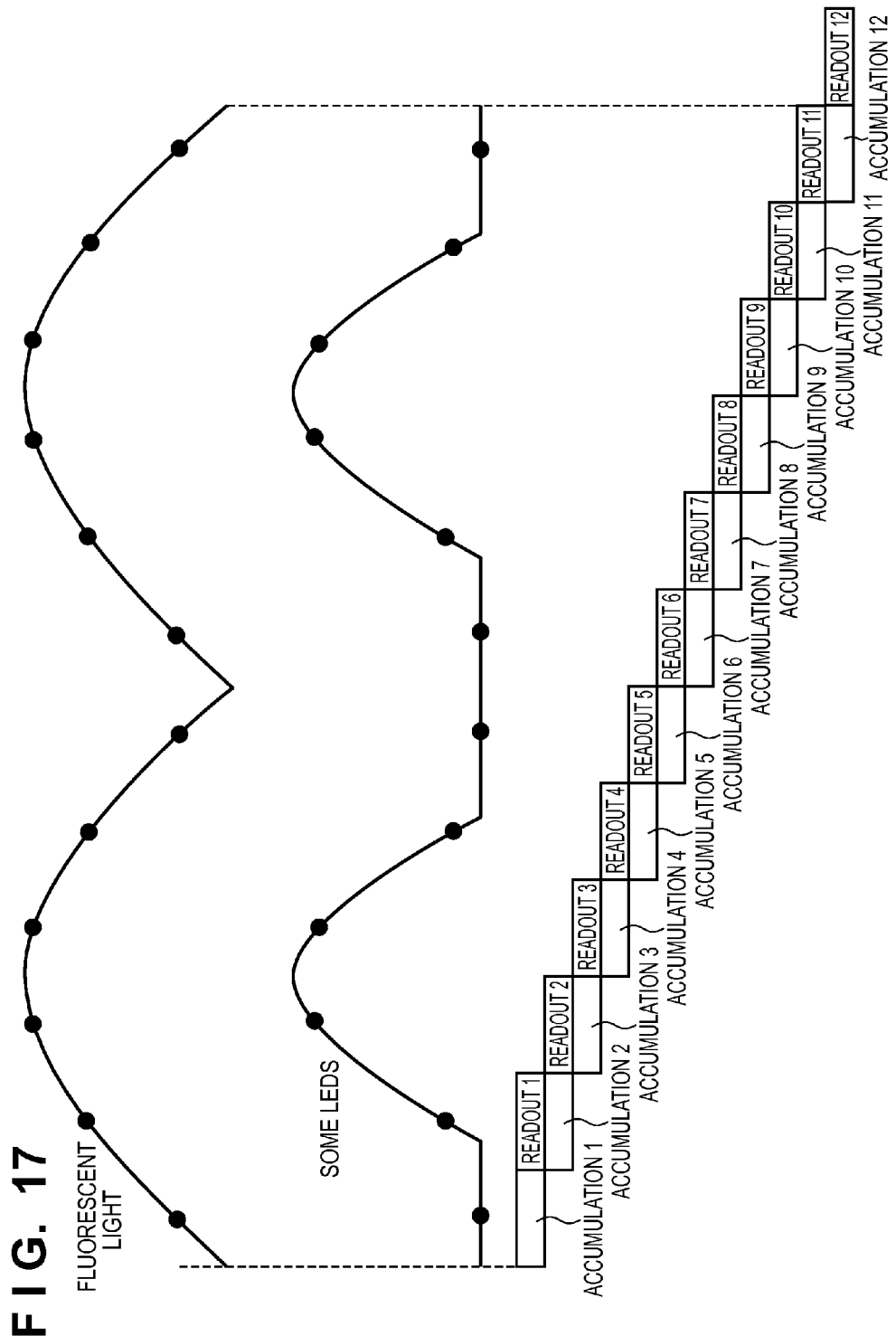

IMAGE CAPTURING APPARATUS, METHOD OF CONTROLLING THE SAME, AND STORAGE MEDIUM

BACKGROUND OF THE INVENTION

Field of the Invention

The present invention relates to an image capturing apparatus represented by a digital camera and, more particularly, to a technique for correction of unevenness of exposure caused by external light variation (generally called flicker) deriving from fluorescent light or the like generated at the time of shooting.

Description of the Related Art

When shooting by using an image capturing apparatus under a flicker light source, a photometry operation to be performed before shutter release has a problem that a photometry result is unstable because a photometry sensor is influenced by flicker. In order to solve such a problem, the accumulation time of the photometry sensor is controlled to an integer multiple of the emission cycle of flicker or accumulation is intermittently performed at predetermined time intervals. This makes it possible to perform stable photometry of average brightness even in a flicker environment.

On the other hand, with recent improvements in the sensitivity of digital cameras, the cameras have been able to shoot with high-speed shutters even under an artificial light source which causes flicker. In indoor sports shooting or the like, high shutter speed shooting has a merit of being able to shoot blur-free photographs. On the other hand, in high shutter speed shooting under a flicker light source, images sometimes vary in brightness and color temperature for each frame because of the influence of flicker.

In order to solve such a problem, Japanese Patent Laid-Open Nos. 6-209427 and 2006-222935 have disclosed a technique of reducing the influence of flicker by detecting the flicker and performing exposure at the peak position of the flicker at which variations in brightness are minimum.

However, the technique disclosed in Japanese Patent Laid-Open Nos. 6-209427 and 2006-222935 is based on the premise of performing moving image shooting. In still image shooting, when exposure is performed at a similar peak position, the release time lag increases depending on the timing of flicker. If the user is allowed to select whether to perform peak position shooting, exposure conditions optimal for shooting vary depending on whether flicker peak position shooting is performed.

FIG. 18 shows a general photometry output in a flicker environment caused when a commercial power supply (50 Hz) is used. There is a photometry difference between a photometry value AE_peak obtained at the peak of flicker and an average photometry value AE_ave. For this reason, when performing peak position shooting under the exposure conditions calculated based on AE_ave as described above, the resultant photograph is overexposed by Δ.

SUMMARY OF THE INVENTION

The present invention has been made in consideration of the above problem and provides an image capturing apparatus which can perform shooting with proper exposure regardless of the presence/absence of a flicker light source.

According to the first aspect of the present invention, there is provided an image capturing apparatus comprising: an image capturing unit; a calculation unit configured to calculate light amount variation characteristics of light from an object; a photometric value determination unit configured to determine a photometry value used for determination of an exposure condition based on the light amount variation characteristics calculated by the calculation unit; and an exposure condition determination unit configured to determine an exposure condition when performing exposure of the image capturing unit at a timing set based on the light amount variation characteristics calculated by the calculation unit, based on the photometry value determined by the photometric value determination unit.

According to the second aspect of the present invention, there is provided an image capturing apparatus comprising: an image capturing unit; a setting unit configured to set an exposure time of the image capturing unit; a calculation unit configured to calculate light amount variation characteristics of light from an object; a photometric value determination unit configured to determine a photometry value used for determination of an exposure condition based on an exposure time set by the setting unit; and an exposure condition determination unit configured to determine an exposure condition when performing exposure of the image capturing unit at a timing set based on the light amount variation characteristics calculated by the calculation unit, based on the photometry value determined by the photometric value determination unit.

According to the third aspect of the present invention, there is provided an image capturing apparatus comprising: an image capturing unit; a calculation unit configured to calculate light amount variation characteristics of light from an object; and a determination unit configured to determine an exposure condition, wherein the determination unit determines a first exposure condition used in a first mode of starting exposure at a timing set based on light amount variation characteristics calculated by the calculation unit and a second exposure condition used in a second mode, in which a wait time from an exposure instruction operation to a start of exposure is shorter than in the first mode, such that the first exposure condition leads to more underexposure than the second exposure condition.

According to the fourth aspect of the present invention, there is provided a method of controlling an image capturing apparatus including an image capturing unit, the method comprising: a calculation step of calculating light amount variation characteristics of light from an object; a photometric value determination step of determining a photometry value used for determination of an exposure condition based on the light amount variation characteristics calculated in the calculation step; and an exposure condition determination step of determining an exposure condition when performing exposure of the image capturing unit at a timing set based on the light amount variation characteristics calculated in the calculation step, based on the photometry value determined in the photometric value determination step.

According to the fifth aspect of the present invention, there is provided a method of controlling an image capturing apparatus including an image capturing unit, the method comprising: a setting step of setting an exposure time of the image capturing unit; a calculation step of calculating light amount variation characteristics of light from an object; a photometric value determination step of determining a photometry value used for determination of an exposure condition based on an exposure time set in the setting step; and an exposure condition determination step of determining an exposure condition when performing exposure of the image capturing unit at a timing set based on the light amount variation characteristics calculated in the calculation step, based on the photometry value determined in the photometric value determination step.

According to the sixth aspect of the present invention, there is provided a method of controlling an image capturing apparatus including an image capturing unit, the method comprising: a calculation step of calculating light amount variation characteristics of light from an object; and a determination step of determining an exposure condition, wherein in the determination step, a first exposure condition used in a first mode of starting exposure at a timing set based on light amount variation characteristics calculated in the calculation step and a second exposure condition used in a second mode, in which a wait time from an exposure instruction operation to a start of exposure is shorter than in the first mode are determined, such that the first exposure condition leads to more underexposure than the second exposure condition.

Further features of the present invention will become apparent from the following description of exemplary embodiments (with reference to the attached drawings).

BRIEF DESCRIPTION OF THE DRAWINGS

FIGS. 4A and 4B are graphs representing photometry outputs at the time of a flicker detection operation;

FIG. 7 is a flowchart showing photometric value determination processing when performing shooting with the reduced influence of flicker on the image capturing apparatus according to the first embodiment;

FIGS. 8A and 8B are views showing the accumulation timing of electric charge for flicker detection and the readout timing of an image signal;

FIG. 9 is a view showing the relationship between vertical pixel addition counts and readout times;

FIGS. 13A to 13E are schematic views each showing an example of a method of calculating a photometry correction value by using waveform prediction with respect to a flicker light source by approximation according to the second embodiment;

FIGS. 16A to 16E are schematic views showing an example of a method of calculating a photometry correction value by using waveform prediction with respect to a flicker light source by approximation according to the third embodiment;

FIG. 17 is a view for explaining the waveforms of the light amount of a fluorescent light and some LEDs.

DESCRIPTION OF THE EMBODIMENTS

An embodiment in which the present invention is applied to a digital single-lens reflex camera will be described in detail below with reference to the accompanying drawings.

First Embodiment

Figure 1A:
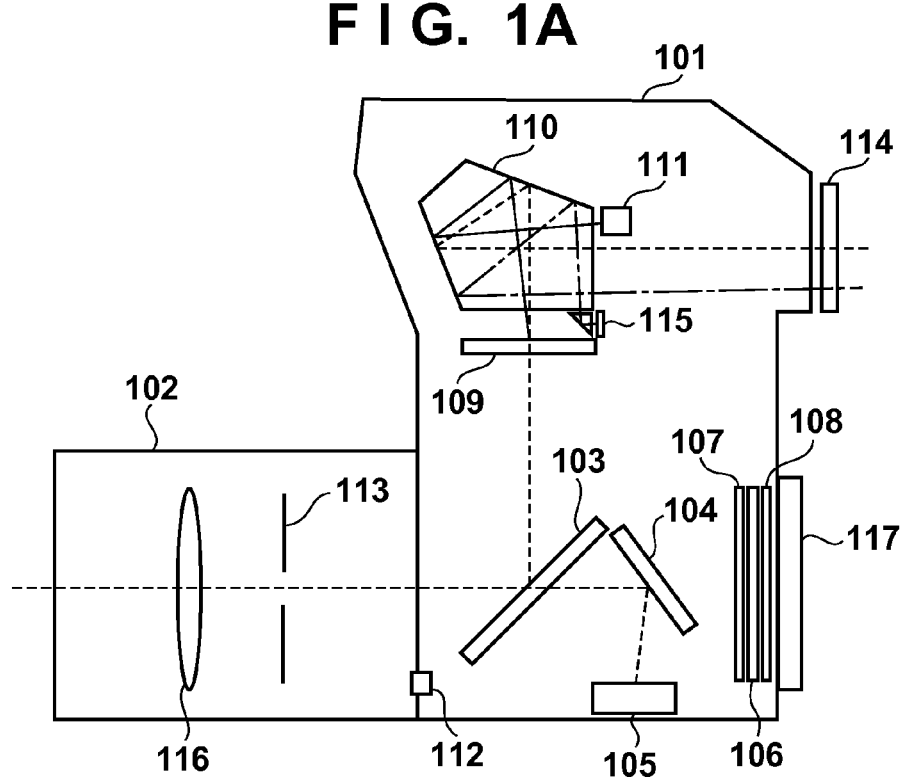
FIGS. 1A and 1B are respectively a sectional view and a top view showing a digital single-lens reflex camera according to an embodiment of the present invention.

FIG. 1A is a sectional view of a single-lens reflex camera according to the first embodiment of the present invention. Referring to FIG. 1A, a photographing lens 102 is mounted on the front surface of a camera body 101. The photographing lens 102 is exchangeable. The camera body 101 is electrically connected to the photographing lens 102 via a mount contact group 112. A stop 113 is arranged in the photographing lens 102 to adjust the amount of light taken in the camera. A focusing lens 116 moves on the optical axis to perform focus adjustment.

A main mirror 103 is a half mirror. The main mirror 103 is obliquely provided on a shooting optical path in a viewfinder observation state to reflect a shooting light beam from the photographing lens 102 toward the viewfinder optical system. At the same time, the light transmitted through the main mirror 103 enters an AF unit 105 via a sub-mirror 104. In a shooting state, the main mirror 103 is retracted outside the shooting optical path.

The AF unit 105 is an AF sensor based on a phase difference detection scheme. Since focus detection based on the phase difference scheme is a known technique, a description of specific control operation will be omitted. An operation based on this scheme will be outlined below. A secondary imaging plane of the photographing lens 102 is formed on a focus detection line sensor to detect the focus adjustment state of the photographing lens 102. The focusing lens 116 is driven based on the detection result to perform automatic focus detection.

This camera includes an image sensor 108, a low-pass filter 106, and a focal plane shutter 107. A focusing screen 109 is arranged on a prospective imaging plane of the photographing lens 102 of the viewfinder optical system. The camera also includes a pentaprism 110 for changing the viewfinder optical path, an eyepiece 114 through which the operator observes the focusing screen 109 to check a shooting screen as indicated by the broken line, and an AE sensor 111 used for photometry. The AE sensor 111 can measure the brightness of an object (perform photometry of the object) by receiving light from the focusing screen, as indicated by the solid line. The camera further includes a built-in LCD 115 for displaying shooting information. The built-in LCD 115 is provided to allow the user to check information associated with shooting, such as exposure conditions, while looking into the eyepiece 114. As indicated by the chain line in FIG. 1A, various types of information can be displayed on the lower side of the screen viewed from the user when he/she looks into the eyepiece.

A display unit 117 is generally formed from a liquid crystal panel, which displays the image shot by the operator and the image signal obtained by the image sensor 108 in real time, thereby allowing the operator to observe the state of the object.

Figure 1B:
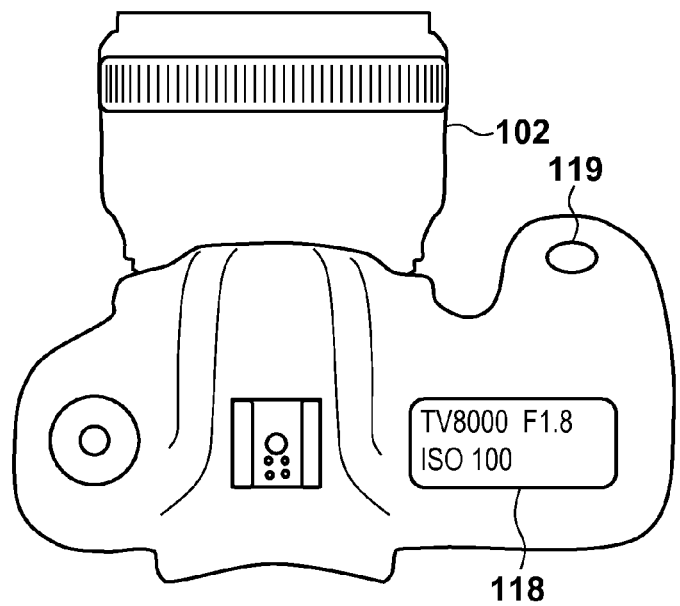

FIG. 1B is a top view of the digital single-lens reflex camera according to this embodiment. A release button 119 is a two-stage switch having a half-pressed state and a full-pressed state. Half-pressing the release button 119 will start a preparing operation before shooting, such as AE and AF. Full-pressing the release button 119 will expose the image sensor 108 and perform shooting processing. In the following description, a half-pressed state is written as the ON state of S1, and a full-pressed state is written as the ON state of S2. Like the built-in LCD 115, an external LCD 118 displays various types of information associated with shooting, such as camera settings and exposure conditions.

Figure 2:
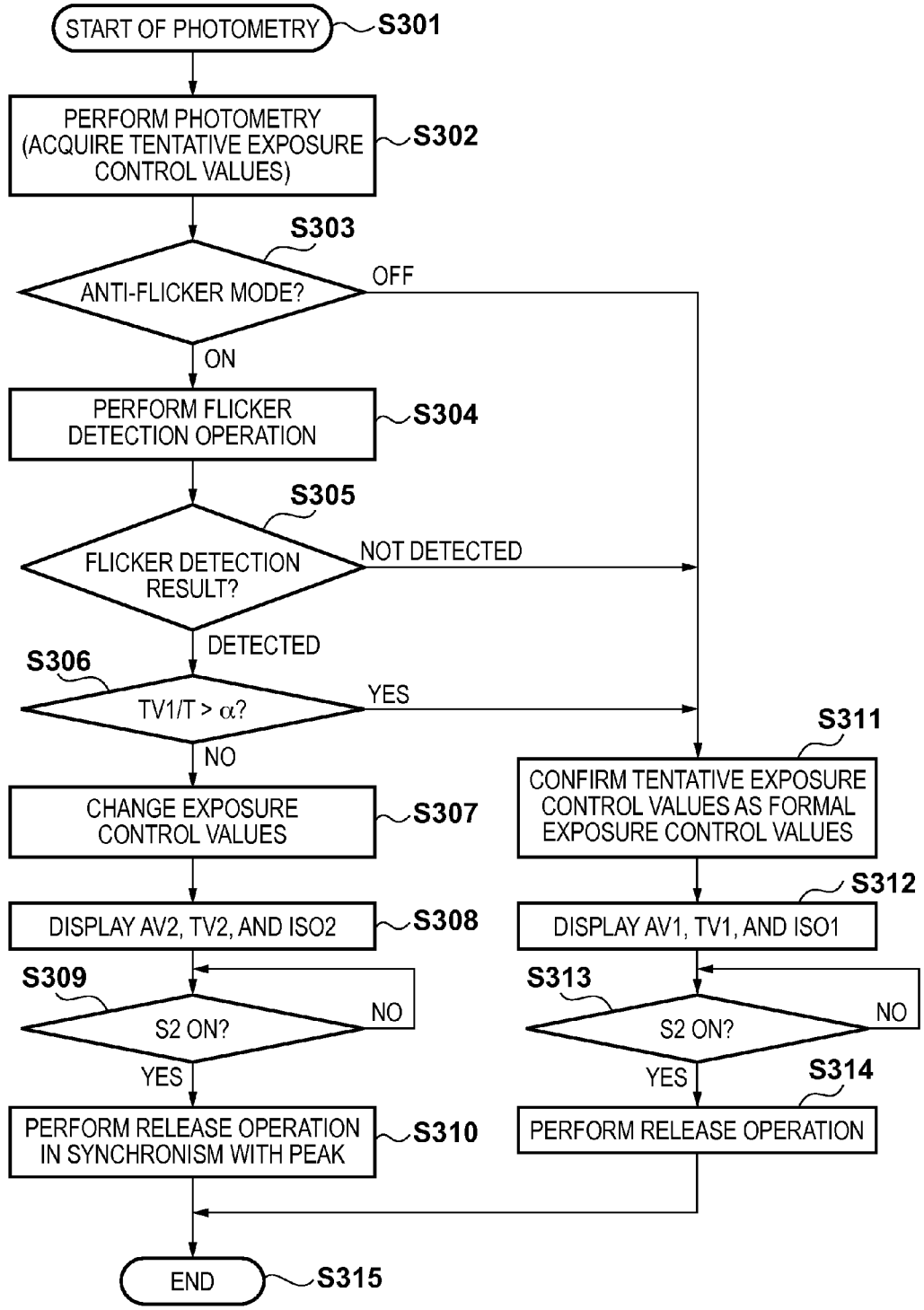
FIG. 2 is a flowchart showing the operation of the camera according to this embodiment.

The operation of the digital single-lens reflex camera according to this embodiment will be described next with reference to the flowchart of FIG. 2.

Figure 3:
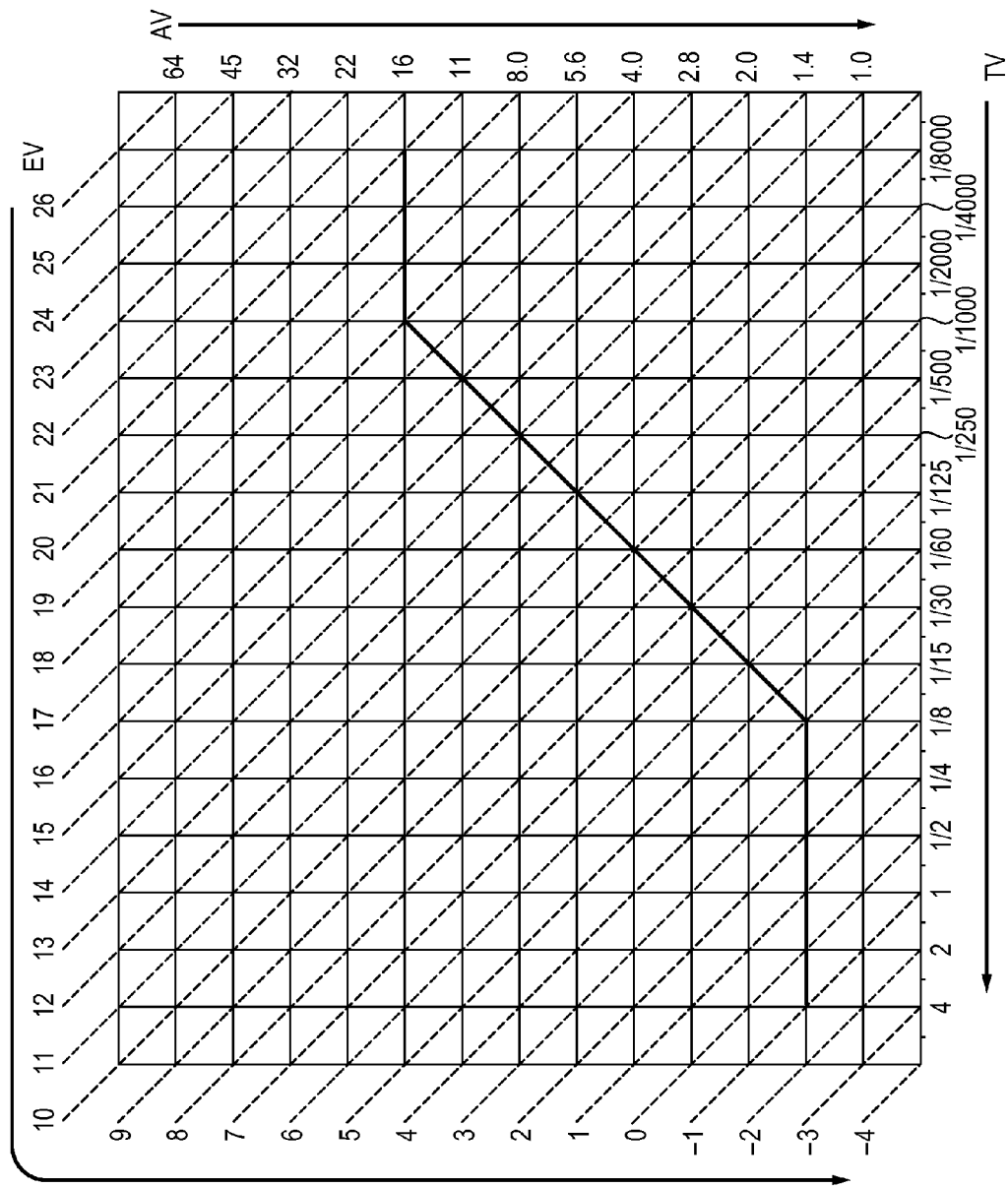
FIG. 3 is a program chart according to this embodiment.

When S1 is turned on, a photometry operation starts in step S301. In step S302, the AE sensor 111 is driven to perform a photometry operation. Even if there is a flicker light source at the time of photometry, in order to prevent variations in photometry value with variations in brightness caused by flicker in ambient environmental light, the average value of photometry values varying with variations in brightness caused by flicker is obtained as a photometry output value. This operation is performed by using the phenomenon that when the accumulation time of the AE sensor 111 is set to an integer multiple of a flicker cycle, constant outputs are obtained regardless of the timing of accumulation. In this case, the frequency at which the brightness of a flicker light source varies is twice the frequency of a commercial power supply. In a 50-Hz power supply area, therefore, the above frequency is 100 Hz, and the emission cycle is 10 ms. Likewise, in a 60-Hz power supply area, therefore, the above frequency is 120 Hz, and the emission cycle is 8.33 ms. That is, when, for example, the accumulation time of the AE sensor 111 is set to 9 ms between 8.33 ms and 10 ms, photometry values almost corresponding to one cycle of flicker are accumulated regardless of whether the power supply frequency is 50 Hz or 60 Hz. Even if there is flicker, it is possible to measure the average value of the photometry values. An aperture value AV1, a shutter speed TV1, and an ISO sensitivity ISO1 as tentative exposure conditions are determined based on the photometry values obtained in this case. AV1, TV1, and ISO1 are determined by using the program chart stored in the camera in advance. FIG. 3 shows an example of the program chart. FIG. 3 shows a case with an ISO of 100, in which AV and TV are uniquely determined when a program chart and a photometry value like those shown in FIG. 3 are determined.

When the tentative exposure control values AV1, TV1, and ISO1 are determined in step S302, the process advances to step S303. In step S303, it is checked whether an anti-flicker mode is ON. If flicker is detected, a releasing operation is performed in synchronism with the peak of the flicker (flicker reduction exposure control) in the subsequent processing. A slight wait time is required to synchronize with the peak. For this reason, the anti-flicker mode has a demerit that the release time lag will increase. For this reason, the camera according to this embodiment allows the user to set whether to execute the anti-flicker mode. In step S303, if the anti-flicker mode is OFF, the process advances to step S311 to perform a normal shooting sequence. If the anti-flicker mode is ON, the process advances to step S304 to perform an anti-flicker sequence. Note that in this embodiment, releasing the shutter button in synchronism with the peak of flicker is to perform exposure near the timing at which the center of an exposure period coincides with the peak of the light amount of the flicker light source.

In step S304, when flicker is detected, a peak synchronization signal is generated upon detecting a light/dark cycle of the flicker. In order to implement these operations, accumulation with an accumulation time of 1.66 ms (predetermined time) is continuously performed 12 times (a plurality of times). FIG. 4A shows accumulation control and output photometry values when flicker is present in a 50-Hz commercial power supply. As shown in FIG. 4A, the nth accumulation is written as "accumulation n", reading out the result of accumulation n is written as "readout n", and the photometry value obtained from the result of readout n is written as "AE(n)". The acquisition time for each photometry value is represented by the median value of accumulation periods because accumulation is performed in a finite time. Although FIG. 4A shows only plots with n=1 and n=2, the same applies to plots with n=3 to 12. Since the flicker emission cycle is 10 ms and 10÷1.66≈6, almost the same photometry values are obtained in six cycles regardless of the timing of accumulation, as shown in FIG. 4A. That is, AE(n)=AE(n+6).

Likewise, in the case with a 60-Hz commercial power supply, the emission cycle of flicker is 8.33 ms, and 8.33/1.66≈5. As shown in FIG. 4B, therefore, almost the same photometry values are obtained in five cycles, and AE(n)=AE(n+5). On the other hand, in a flicker-free environment, AE(n) is almost constant regardless of n. In consideration of the above description, when evaluation values F50 and F60 are respectively defined as follows:

$$F50 = \sum_{i=1}^{6} |AE(n) - AE(n+6)| \qquad (1)$$

$$F60 = \sum_{i=1}^{6} |AE(n) - AE(n+5)| \qquad (2)$$

and a predetermined threshold F_th is used, the following determination can be made:
(1) If F50<F_th and F60<F_th, it can be determined that no flicker is present.
(2) If F50<F_th and F60≥F_th, it can be determined that a flicker environment with emission cycle T=10 ms (power supply frequency of 50 Hz) is present.
(3) If F50≥F_th and F60<F_th, it can be determined that a flicker environment with emission cycle T=8.33 ms (power supply frequency of 60 Hz) is present. In addition, in some case, panning or the movement of an object may cause both F50 and F60 to exceed F_th. In this case, F50 and F60 are compared with each other. If F50 is smaller, it is determined that a flicker environment with emission cycle T=10 ms (power supply frequency of 50 Hz) is present. If F60 is smaller, it is determined that a flicker environment with emission cycle T=8.33 ms (power supply frequency of 60 Hz) is present. That is,
(4) if F50≥F_th and F60≥F_th, flicker environment with emission cycle T=10 ms (power supply frequency of 50 Hz) is present when F50≤F60, and flicker environment with emission cycle T=8.33 ms (power supply frequency of 60 Hz) is present when F50>F60.

Figure 5A:
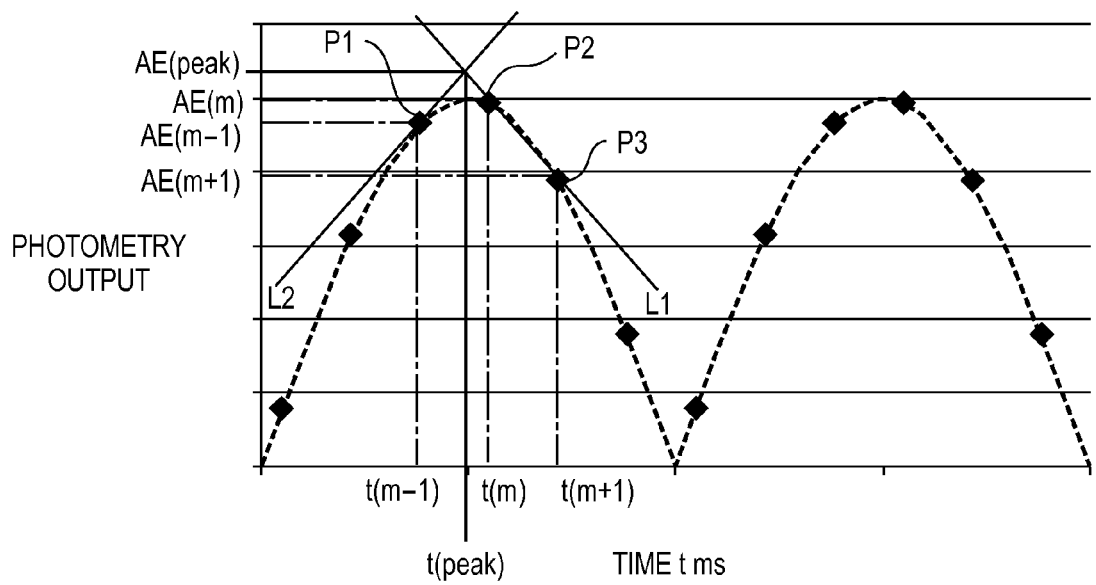
FIGS. 5A and 5B are views for explaining the peak photometry value of flicker and a method of calculating the corresponding timing.
Figure 5B:
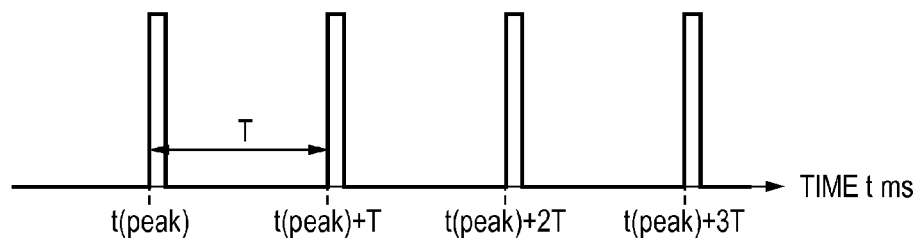

In step S304, a peak synchronization signal is generated when flicker is present. This operation is basically the processing of interpolating 12 obtained photometry values and calculating a time t(peak) when a peak is obtained. FIG. 5A is a graph for explaining an example of a method of calculating a peak timing. Of AE(1) to AE(12), a point at which the maximum output is obtained is represented by P2(t(m), AE(m)), a point corresponding to the immediately preceding photometry result is represented by P1(t(m−1), AE(m−1)), and a point corresponding to the immediately succeeding photometry result is represented by P3(t(m+1), AE(m+1)). A straight line passing through two points including a point (P3 in FIG. 5A) corresponding to a smaller one of AE(m−1) and AE(m+1) and the point P2 is obtained as L1=at+b. In addition, a peak timing t (peak) and a photometry value AE(peak) can be calculated by obtaining the intersection point between L1 and L2, with L2 representing a straight line with an inclination −a which passes through a point (P1 in FIG. 5A) corresponding to a larger one of AE1 and AE3. In addition, since the emission cycle T of flicker is known, a peak synchronization signal like that shown in FIG. 5B is generated, which changes for each timing of t=t(peak)+nT (n is a natural number). When flicker is detected in step S304 upon determination of the presence/absence of flicker, the emission cycle of the flicker, a peak photometry value, and a peak synchronization signal are generated. The process then advances to step S305.

Step S305 is a branching step based on the determination of the presence/absence of flicker in step S304. If no flicker is detected, the process advances to step S311 as a normal shooting sequence. If flicker is detected, the process advances to step S306.

In step S306, the shutter speed TV1 as a tentative exposure condition is evaluated. In this embodiment, an exposure timing at the time of shooting is adjusted to near the peak of the flicker to perform exposure in a time zone with less variations in brightness. For this reason, this operation is effective when the shutter speed is very high. If, however, the shutter speed is longer than the flicker cycle, variations in brightness are averaged, and flicker has almost no influence on a shot image. That is, this operation is not very effective. For this reason, a predetermined ratio α is set in the camera to evaluate the ratio between the tentative shutter speed TV1 and the emission cycle T of flicker. That is, TV1/T as the ratio of the tentative exposure time TV1 to T which is the cycle of flicker is compared with the predetermined value α. If TV1/T>α, it is determined that the shutter speed is sufficiently long relative to the emission cycle T and the influence of the flicker on a shot image is sufficiently low, and the process advances to step S311 as the normal shooting sequence. In contrast to this, if TV1/T≤α, since it is necessary to perform exposure in synchronism with the peak, the process advances to step S307.

Note that a method of evaluating the difference between TV1 and the emission cycle T of flicker may be used instead of the method of evaluating the ratio between the tentative shutter speed TV1 and the emission cycle T of flicker. Alternatively, it is possible to use a method of evaluating the ratio of the shutter speed TV1 to a reference value other than the emission cycle T or a method of evaluating the difference between TV1 and the reference value.

Step S307 is the step of reevaluating a photometry value based on the premise of performing peak synchronization shooting, with the exposure timing at the time of shooting matching near the peak of flicker. The tentative exposure conditions AV1, TV1, and ISO1 in the sequence described so far are based on the result of the photometry of the average value of light amounts of the flicker light source acquired in step S302. In contrast to this, in peak synchronization shooting, since exposure is performed at the peak of flicker, photometry should be performed by using a photometry value at the peak. Since the photometry value at the peak has been calculated as AE(peak) in step S304, new exposure conditions AV2, TV2, and ISO2 are obtained from AE(peak) and the program chart of FIG. 3. These values are set as formal exposure conditions in step S307.

Since the formal exposure conditions have been confirmed so far, AV2, TV2, and ISO2 are displayed on the built-in LCD 115 and the external LCD 118 in step S308. This enables the user to check proper exposure conditions before shooting when even performing peak synchronization shooting. In step S309, an S2 signal as an exposure instruction from the user is waited. When information indicating that S2 is turned on is received, exposure is performed by using TV2 in synchronism with the peak synchronization signal generated in step S304. Performing exposure in synchronism with the peak can obtain a shot image with less influence of flicker under proper exposure conditions with respect to the peak luminance because exposure is performed at the timing when variations in brightness are small.

Steps S311 to S314 correspond to the normal shooting sequence when the anti-flicker mode is not executed. In step S311, the tentative exposure conditions AV1, TV1, and ISO1 are confirmed as formal exposure conditions. Steps S312 and S313 are the same as steps S308 and S309. In step S314, an exposure operation is performed without waiting for the peak of flicker at the time when S2 is turned on.

As described above, in this embodiment, different photometry values are used to determine exposure control values when the anti-flicker mode is ON (first image capturing control) and exposure control values when the anti-flicker mode is OFF (second image capturing control).

Note that in the above flowchart, a photometry operation starts when S1 is turned on. However, the camera may be configured to automatically start a photometry operation cyclically regardless of whether S1 is turned on.

In addition, in the above flowchart, there is no description about a case in which the ON or OFF state of the anti-flicker mode is changed after formal exposure conditions are confirmed. However, when the mode is changed, the process may return to step S303 to perform the subsequent processing.

Since formal exposure conditions are switched in accordance with a change of the ON or OFF state of the anti-flicker mode in this manner, it is possible to perform shooting with proper exposure regardless of the presence/absence of flicker. In addition, since exposure conditions to be displayed are switched in accordance with a change of the ON or OFF state of the anti-flicker mode, the user can accurately check the exposure conditions to be used for shooting regardless of the presence/absence of flicker. This facilitates changing to the exposure conditions to those intended by the user and can perform shooting with proper exposure for the user.

In addition, in the above embodiment, in the anti-flicker mode, the exposure timing at the time of shooting is matched with near the peak of flicker. However, the exposure timing may be matched with any predetermined timing other than a timing near the peak as long as the influence of flicker can be reduced. For example, the light amount of a flicker light source changes at two timings, that is, the timing (peak) when the light amount becomes maximum and the timing (bottom) when the light amount becomes minimum. For this reason, it is also possible to reduce the influence of flicker by matching the exposure timing at the time of shooting with near the bottom of the flicker in the anti-flicker mode.

Furthermore, in the above embodiment, there is no specific description about a photometry scheme. However, the embodiment may be configured to manually or automatically set a photometry scheme from known photometry schemes including evaluation photometry, spot photometry, and average photometry. In such an arrangement, when different photometry schemes are set depending on whether the anti-flicker mode is ON or OFF, exposure conditions may be changed in consideration of also the differences between the photometry schemes. When, for example, the anti-flicker mode is ON, it is not possible to accurately detect flicker by a photometry scheme designed to obtain a local photometry value, such as spot photometry. In this case, therefore, average photometry is automatically set. When the anti-flicker mode is OFF, there is no such restriction, a photometry scheme other than average photometry is also set. As described above, in the arrangement in which a photometry scheme to be used is fixed when the anti-flicker mode is ON, the photometry scheme tends to differ from a photometry scheme set when the anti-flicker mode is OFF. It is therefore preferable to change exposure conditions in consideration of also the differences between the photometry schemes in the above manner.

Second Embodiment

The second embodiment of the present invention will be described next. In the second embodiment, when the anti-flicker mode is ON, different photometry values are used for the determination of exposure control values in accordance with shutter speeds. This makes it possible to accurately determine exposure control values.

Figure 6:
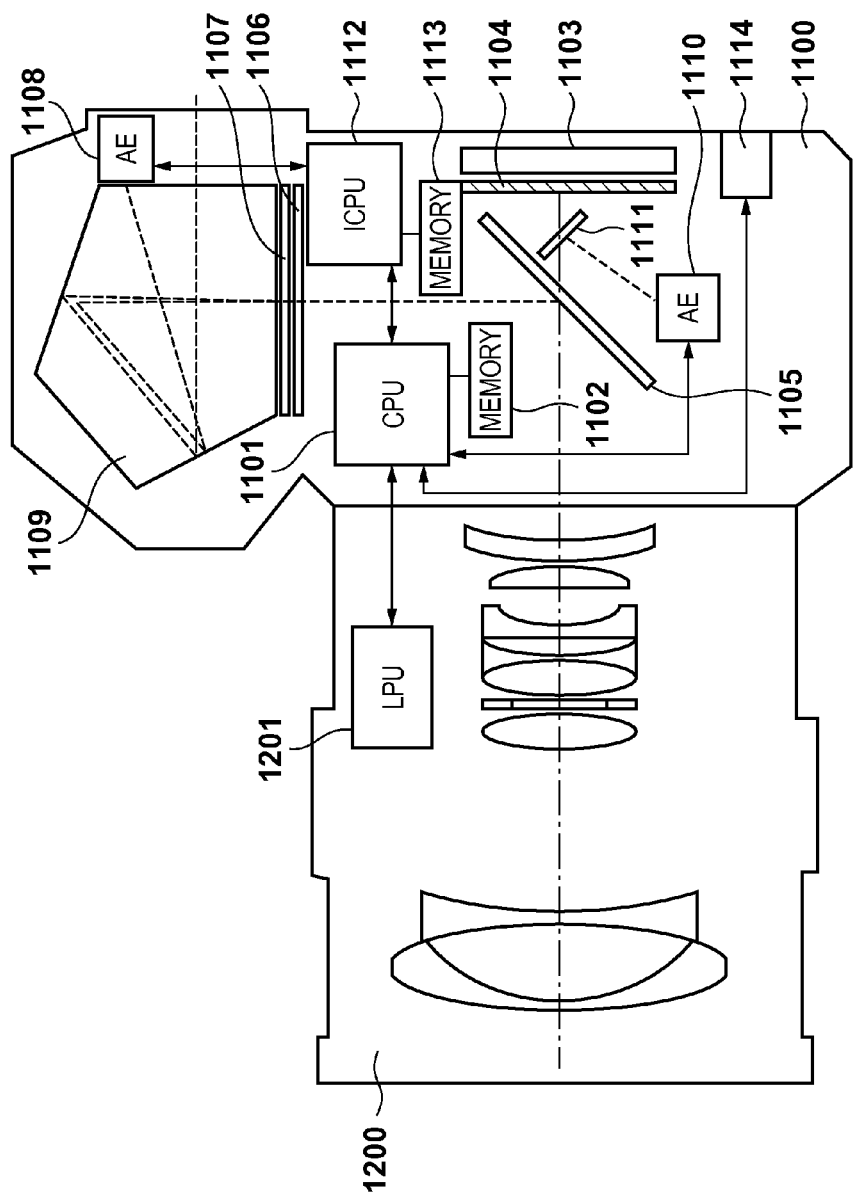
FIG. 6 is a schematic view showing the arrangement of an image capturing apparatus according to an embodiment of the present invention.

FIG. 6 is a schematic view showing the arrangement of an image capturing apparatus according to this embodiment. The image capturing apparatus according to this embodiment includes a camera body 1100 and a lens unit 1200 detachable from the camera body 1100.

The arrangement of the camera body 1100 will be described first. A microcomputer CPU (to be referred to as a camera microcomputer) 1101 controls the respective units of the camera body 1100. A memory 1102 is a memory such as a RAM or ROM connected to the camera microcomputer 1101.

An image sensor 1103 is, for example, a CCD or CMOS including an infrared cut filter or low-pass filter. The image sensor 1103 photoelectrically converts a light beam entering through the lens unit 1200 and outputs an image signal.

A shutter 1104 runs to set a light-shielding state to shield the image sensor 1103 from a light beam entering through the lens unit 1200 and a retracting state to guide a light beam entering through the lens unit 1200 to the image sensor 1103. That is, the shutter 1104 can change to the first state to shield the image sensor 1103 from light and the second state not to shield the image sensor 1103 from light, thereby functioning to adjust the exposure time of the image sensor 1103. Note that the camera may be configured to adjust the exposure time of the image sensor 1103 by a so-called electronic shutter function of controlling the electric charge accumulation period of the image sensor 1103 by using the camera microcomputer 1101.

A half mirror 1105 can move to a position (mirror-up state) to guide a light beam entering through the lens unit 1200 to the image sensor 1103 and to a position (mirror-down state) to guide the light beam to a photometry sensor 1108. That is, the half mirror 1105 changes the optical path of a light beam entering through the lens unit 1200 to a state to guide the light beam to the image sensor 1103 and to a state to guide the light beam to the photometry sensor 1108. When the half mirror 1105 is located at the position to guide a light beam to the photometry sensor 1108, the half mirror 1105 forms the light beam entering through the lens unit 1200 into an image on a focusing screen 1106.

A display element 1107 uses a PN liquid crystal or the like and displays a frame (AF frame) indicating a focus detection area used for automatic focus adjustment control (AF control). The photometry sensor 1108 can detect the face of an object, track the object, and detect flicker, as well as performing photometry, based on output image signals by using an electric charge accumulation type image sensor designed to accumulate electric charges corresponding to the amount of incident light, such as a CCD or CMOS. Note that flicker may be detected based on the image signal output from the image sensor 1103 instead of the image signal output from the photometry sensor 1108.

A pentaprism 1109 guides a light beam reflected by the half mirror 1105 and entering through the lens unit 1200 to the photometry sensor 1108 and an optical viewfinder (not shown). A focus detection circuit 1110 performs focus detection for AF control. An AF mirror 1111 guides part of a light beam entering through the lens unit 1200 and passing through the half mirror 1105.

A CPU 1112 is a CPU (to be referred to as an ICPU hereinafter) for drive control and image processing/computation for the photometry sensor 1108, and performs various types of computation associated with photometry, object face detection, object tracking, and the like based on output signals (image signals) from the photometry sensor 1108. The ICPU 1112 calculates, based on the output signals from the photometry sensor 1108, light amount variation characteristics such as the light amount variation cycle of light from an object and a timing at which the amount of light satisfies a predetermined condition (a timing at which the amount light becomes maximum or minimum). A memory 1113 is, for example, a RAM or ROM connected to the ICPU 1112. Although this embodiment is configured to have the ICPU 1112 independently of the camera microcomputer 1101, the embodiment may be configured to cause the camera microcomputer 1101 to execute processing executed by the ICPU 1112.

An operation unit 1114 includes a release button with which the user issues an instruction to cause the camera body 1100 to start a shooting preparation operation and an instruction to cause the camera body 1100 to perform a shooting operation and a setting button with which the user makes various types of settings in the camera body 1100. The operation unit 1114 also includes a power switch with which the user switches on and off the power supply of the camera body 1100, a mode dial with which the user selects a shooting mode for the camera body 1100 from a plurality of modes, and a touch panel.

The arrangement of the lens unit 1200 will be described next. A lens CPU 1201 (to be referred to as an LPU) controls the respective units of the lens unit 1200, for example, the focus lens, the zoom lens, and the stop driving unit, and transmits information associated with the lenses to the camera microcomputer 1101.

Photometric value determination processing to be performed when performing shooting with the reduced influence of flicker will be described next with reference to FIG. 7. FIG. 7 is a flowchart showing photometric value determination processing to be performed by the image capturing apparatus according to this embodiment when performing shooting with the reduced influence of flicker.

First of all, when the user operates the power switch to turn on the power supply of the camera body 1100, the ICPU 1112 discriminates in step S1101 whether a photometry permitted state is set. If the photometry permitted state is not set, the ICPU 1112 repeats step S1101. Note that when the user turns on the power supply of the camera body 1100 or turns on SW1 corresponding to the half-pressed state of the release button, the photometry permitted state is set. When the user does not operate the camera body 1100 in the photometry permitted state for a predetermined period of time, the photometry permitted state is canceled.

If the photometry permitted state is set, the process advances to step S1102 to perform an accumulation/readout operation for normal photometry. This photometry operation is the same as the operation in step S302 in FIG. 2 in the first embodiment, and hence a description of the operation will be omitted.

In step S1103, the ICPU 1112 acquires a normal photometry value BV by performing computation (to be referred to as photometry computation hereinafter) associated with photometry in step S1103 based on the image signal obtained by the photometry sensor 1108 upon electric charge accumulation and image signal readout in step S1102. The normal photometry value BV may be acquired by a known computation method. For example, the normal photometry value BV may be acquired by dividing the luminance component of the image signal obtained in step S1102 by the accumulation time. In this case, the normal photometry value BV may also be acquired by dividing the image signal into a plurality of photometry regions and weighted averaging the luminance components of the respective photometry regions.

In step S1104, the photometry sensor 1108 performs electric charge accumulation and image signal readout for flicker detection a plurality of times, as shown in FIGS. 8A and 8B. FIGS. 8A and 8B each show electric charge accumulation timings and image signal readout timings for flicker detection. Accumulation/readout is consecutively performed 12 times at 600 fps (a cycle of about 1.667 ms). This value, 600 fps, is equal to the least common multiple of assumed flicker frequencies (100 Hz and 120 Hz). Performing accumulation at 600 fps 12 times will perform accumulation in a period of 20 ms as a whole. Therefore, the resultant data includes the light amount variations of the flicker light source corresponding to two cycles regardless of whether the commercial power supply frequency is 50 Hz or 60 Hz.

A method of driving the photometry sensor 1108 at 600 fps (a cycle of 1.667 ms) will be described below.

In this embodiment, object face detection, object tracking, flicker detection, and the like are performed, as well as photometry, based on image signals output from the photometry sensor 1108. In order to accurately perform object face detection, the photometry sensor 1108 needs to have a certain pixel count equivalent to, for example, QVGA. A complex, expensive circuit arrangement is required to read out all pixel signals from an image sensor having a pixel count that enables accurate object face detection at a frame rate of 600 fps or more.

Under the circumstance, with respect to an image signal for object face detection, all the pixel signals are read out, whereas with respect to an image signal for flicker detection, the frame rate is adjusted to 600 fps (a cycle of 1.667 ms) by performing pixel addition readout or thinning-out readout.

When using a CCD as the photometry sensor 1108, it is preferable to shorten the readout time by spuriously decreasing the number of readout lines by the pixel addition readout operation of reading out pixel signals upon addition. For example, performing vertical pixel addition in a CCD with a striped pixel arrangement will produce the effect of shortening the readout time, as shown in FIG. 9. FIG. 9 shows the relationship between vertical pixel addition counts and readout times. The following is an example of a CCD having a readout time of 6.25 ms when reading out all pixel signals without any pixel signal addition (the vertical pixel addition count is 1). In the case of the CCD having the characteristics shown in FIG. 9, performing 9 pixel addition will result in a readout time of 1.66 ms. This can set the frame rate to about 600 fps. The pixel count of the image signal in the vertical direction read out in this case is ⅑ that of the image signal read out without any pixel signal addition. However, in flicker detection, only photometry values between image signals are compared with each other, there is no problem when using even an image signal with a reduced pixel count in the vertical direction.

In addition, when using a CMOS as the photometry sensor 1108, it is preferable to adjust the total accumulation/readout time to a cycle of about 1.667 ms by so-called thinning-out readout with limitation imposed on horizontal lines for the readout of pixel signals.

With that, the description of the method of driving the photometry sensor at about 600 fps (a cycle of about 1.667 ms) is ended. Note that the above accumulation/readout cycle of the photometry sensor is merely an example, and the frame rate may not be about 600 fps (a cycle of about 1.667 ms). For example, since the longer the accumulation time, the more effective for a low-illuminance environment, the accumulation time for one operation may be set to be longer than about 1.667 ms, and the frame rate may be set to be shorter than 600 fps. Alternatively, since the shorter the accumulation/readout cycle, the shorter the time required for flicker detection, the accumulation time for one operation may be set to be shorter than about 1.667 ms. In this case, the frame rate may be set to be higher than 600 fps by setting a vertical pixel addition count to a pixel addition count that shortens the readout time to a time shorter than 1.66 ms. In addition, the relationship between vertical pixel addition counts and readout times shown in FIG. 9 is merely an example. Note however that since the larger the difference between the frame rate and 600 fps, the larger the difference between the accumulation/readout cycle of the photometry sensor and the light amount variation cycle of the flicker light source, it is preferable to set a frame rate within 600 fps ±1% to ±2%. That is, the photometry cycle of the photometry sensor is preferably almost equal to the reciprocal of the least common multiple of a frequency twice the first commercial power supply frequency and a frequency twice the second commercial power supply frequency.

When electric charge accumulation and image signal readout for flicker detection are complete in step S1104, the ICPU 1112 performs flicker detection computation based on the readout image signal in step S1105. FIGS. 8A and 8B show this flicker detection operation. Since the contents of this operation are the same as that described in step S304 in FIG. 2 in the first embodiment with reference to FIGS. 4A and 4B, a description of the operation will be omitted.

Note that when, for example, the image capturing apparatus moves for panning or the like or an object moves during accumulation for flicker detection, photometry values may greatly vary to result in F50≥F_th and F60≥F_th (see the first embodiment). In this case, F50 is compared with F60 to detect flicker. More specifically, if F50≥F_th, F60≥F_th, and F50≤F60, then it is determined that flicker with a light amount variation cycle of 10 ms has occurred (a flicker light source with a commercial power supply frequency of 50 Hz is present). In contrast, if F50≥F_th, F60≥F_th, and F50>F60, then it is determined that flicker with a light amount variation cycle of 8.33 ms has occurred (a flicker light source with a commercial power supply frequency of 60 Hz is present). Note that if F50≥F_th, F60≥F_th, and F50=F60, then it may be determined that no flicker has occurred or cannot be detected, because the light amount variation cycle of a flicker light source cannot be determined.

If F50≥F_th and F60≥F_th, the light amount variation cycle of a flicker light source is determined. If, however, F50≥F_th and F60≥F_th, since the flicker detection accuracy is low, accumulation for flicker detection may be redone.

If no flicker light source is present, since there is no need to correct the photometry value BV acquired in step S1102, the subsequent processing is not performed. In addition, if no flicker light source is present, there is no need to adjust an exposure timing for shooting with the reduced influence of flicker, and normal shooting is to be performed. Therefore, a detailed description of this operation will be omitted.

Figure 10:
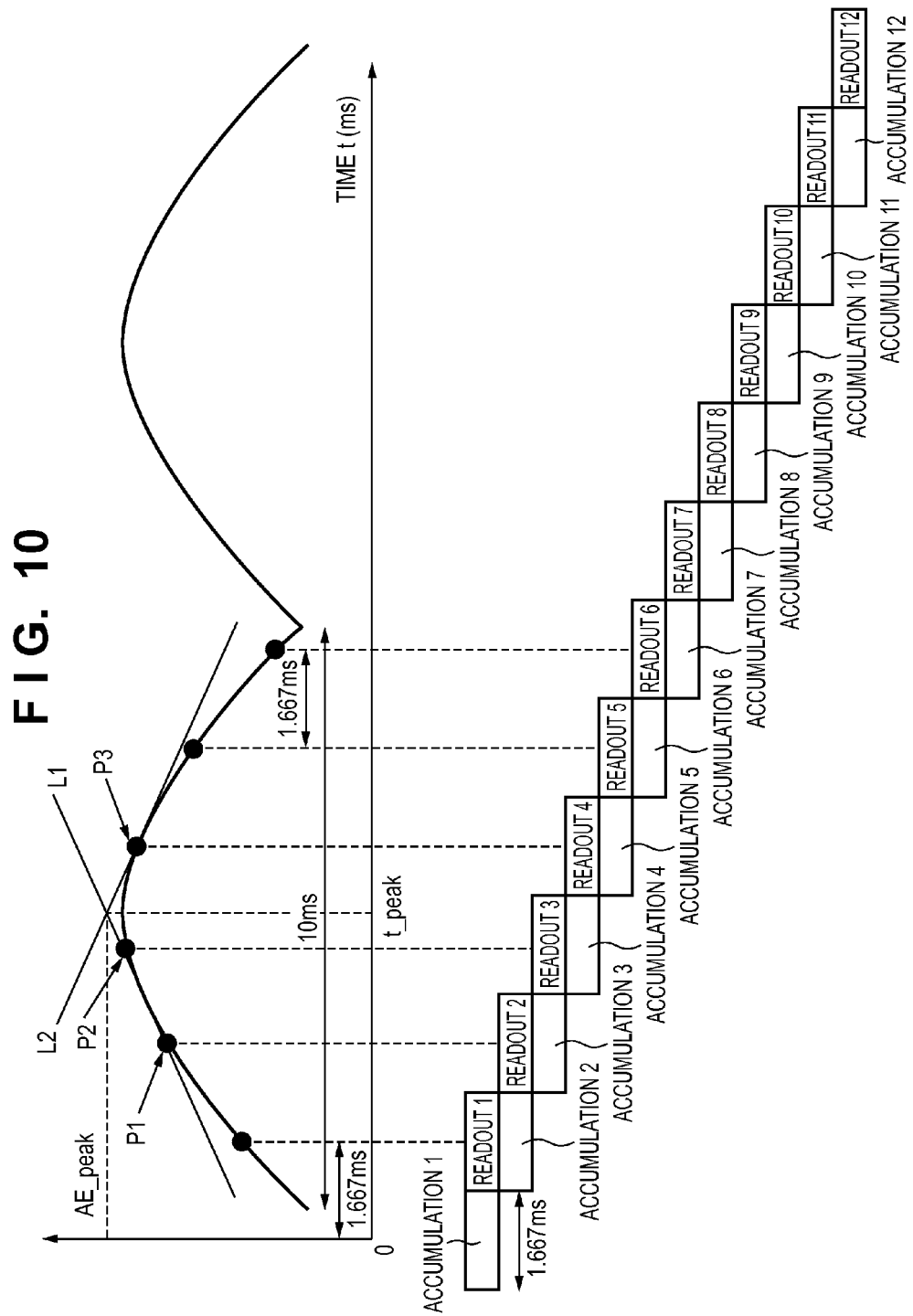
FIG. 10 is a schematic view showing an example of a method of calculating the timing of the peak of the light amount of a flicker light source.

In step S1105, if a flicker light source is present, the ICPU 1112 obtains the timing of a feature point of flicker. FIG. 10 is a view for explaining an example of a method of calculating the timing of the peak of the light amount of a flicker light source, which is an example of the timing of a feature point of flicker. The description to be made with reference to FIG. 10 is the same as that made with reference to FIGS. 5A and 5B in the first embodiment, and hence will be omitted.

In addition, in step S1105, the ICPU 1112 calculates a photometry correction value for exposure to be performed in accordance with the timing of the peak of the light amount of flicker. The ICPU 1112 calculates this photometry correction value in accordance with a shutter speed. A method of calculating a photometry correction value will be described below.

First of all, in order to calculate a photometry correction value in accordance with a shutter speed, the range of shutter speeds (TV) set when performing shooting with the reduced influence of flicker is divided into, for example, five sections. The respective sections are defined as $1/8000 \leq TV \leq 1/500$, $1/500 < TV \leq 1/250$, $1/250 < TV \leq 1/200$, $1/200 < TV \leq 1/160$, and $1/160 < TV \leq 1/125$.

When the shutter speed is lower than $1/100$ sec, since exposure is performed in a period equal to or longer one light amount variation cycle of a flicker light source, the influence of flicker is small. In addition, even if the shutter speed corresponds to an exposure period less than one light amount variation cycle of the flicker light source, it is regarded that the influence of flicker is relatively small, as long as the exposure period is close to one light amount variation cycle of the flicker light source. For this reason, when the shutter speed is 8 ms ($1/125$ s) or less, shutter control is performed to reduce the influence of flicker. When the shutter speed is longer than 8 ms, since shooting with the reduced influence of flicker is not performed, no photometry correction value is calculated.

Figure 11:
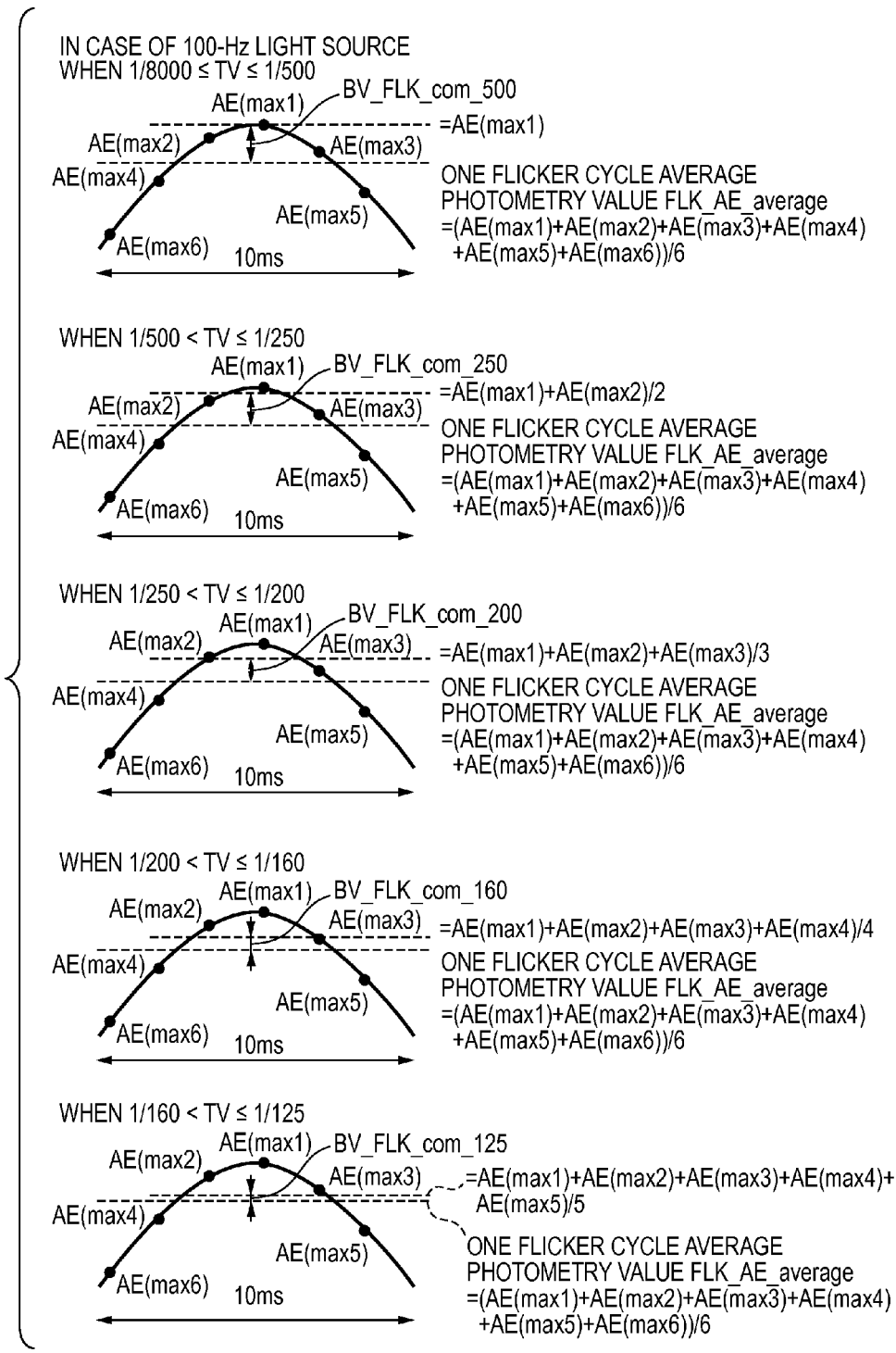
FIG. 11 is a view showing the relationship between shutter speeds and photometry values corrected by photometry correction values according to the first embodiment.

Subsequently, as shown in FIG. 11, assume that a plurality of photometry values obtained in one light amount variation cycle or more of the flicker light source are AE(max1), AE(max2), AE(max3), AE(max4), AE(max5), and AE(max6) in descending order. FIG. 11 is a view showing the relationship between shutter speeds and photometry correction values. An average photometry value FLK_AE_average in one light amount variation cycle of the flicker light source is calculated by equation (3) or (4) given below. When the frequency of the light source is 100 Hz, $$FLK\_AE\_\text{average} = \Sigma_{n=1}^{6} AE(\max(n))/6 \quad (3)$$

When the frequency of the light source is 120 Hz, $$FLK\_AE\_\text{average} = \Sigma_{n=1}^{5} AE(\max(n))/5 \quad (4)$$

Photometry correction values corresponding to shutter speeds are then calculated by equations (5) to (9).

A photometry correction value (BV_FLK_com_500) used when $1/8000 \leq TV \leq 1/500$ is obtained by equation (5):

$$(BV\_FLK\_\text{com}\_500) = AE(\max 1) - FLK\_AE\_\text{average} \quad (5)$$

A photometry correction value (BV_FLK_com_250) used when $1/500 \leq TV \leq 1/250$ is obtained by equation (6):

$$(BV\_FLK\_\text{com}\_250) = \{AE(\max 1) + AE(\max 2)\}/2 - FLK\_AE\_\text{average} \quad (6)$$

A photometry correction value (BV_FLK_com_200) used when $1/250 \leq TV \leq 1/200$ is obtained by equation (7):

$$(BV\_FLK\_\text{com}\_200) = \{AE(\max 1) + AE(\max 2) + AE(\max 3)\}/3 - FLK\_AE\_\text{average} \quad (7)$$

A photometry correction value (BV_FLK_com_1600) used when $1/200 \leq TV \leq 1/160$ is obtained by equation (8):

$$(BV\_FLK\_\text{com}\_160) = \{AE(\max 1) + AE(\max 2) + AE(\max 3) + AE(\max 4)\}/4 - FLK\_AE\_\text{average} \quad (8)$$

A photometry correction value (BV_FLK_com_125) used when $1/160 \leq TV \leq 1/125$ is obtained by equation (9):

$$(BV\_FLK\_\text{com}\_125) = \{AE(\max 1) + AE(\max 2) + AE(\max 3) + AE(\max 4) + AE(\max 5)\}/5 - FLK\_AE\_\text{average} \quad (9)$$

As described above, when performing exposure in accordance with the timing of the peak of the light amount of flicker, as the exposure time shortens (the shutter speed increases), the average value becomes that of values closer to the maximal value of light amount variations, and hence a larger photometry correction value is set. Note that this embodiment has exemplified the case in which the range of shutter speeds set when performing shooting with the reduced influence of flicker is divided into five sections. However, the number of divided sections may be larger or smaller than five. In this case, it is preferable to not only change the number of photometry values but also calculate photometry correction values to be used in the respective sections while changing weighting coefficients for the respective photometry values.

Upon completion of flicker detection computation and calculation processing for photometry correction values in step S1105, the ICPU 1112 checks the shooting mode selected by the user in step S1106. In this embodiment, as the user operates the mode dial of the operation unit 1114, the camera microcomputer 1101 sets one of a TV priority mode, an AV priority mode, a manual exposure mode, and a full automatic exposure mode. The TV priority mode is a mode in which the camera microcomputer 1101 determines at least one of the aperture value AV and the ISO sensitivity (shooting sensitivity) SV based on the shutter speed selected by the user and the photometry value output from the ICPU 1112. The AV priority mode is a mode in which the camera microcomputer 1101 determines at least one of a shutter speed and an ISO sensitivity based on the aperture value selected by the user and the photometry value output from the ICPU 1112. The manual exposure mode is a mode in which at least the user selects a shutter speed and an aperture value. The full automatic exposure mode is a mode in which the camera microcomputer 1101 determines all values including an aperture value, a shutter speed, and an ISO sensitivity based on the photometry value output from the ICPU 1112. The camera microcomputer 1101 determines an aperture value, a shutter speed, and an ISO sensitivity by using the program chart stored in the memory 1102 in advance.

If the TV priority mode or manual exposure mode is set and a shutter speed is determined in advance based on user selection (the camera microcomputer 1101 has set an exposure time based on the operation by the user on the operation unit 1114), the process advances to step S1107. In step S1107, the ICPU 1112 selects a photometry correction value to be used in accordance with a predetermined shutter speed.

If the AV priority mode or full automatic exposure mode is set and no shutter speed is determined in advance, the process advances to step S1108. In step S1108, the camera microcomputer 1101 tentatively determines an aperture value, a shutter speed, and an ISO sensitivity based on the normal photometry value BV acquired in step S1103. The ICPU 1112 selects a photometry correction value to be used in accordance with the shutter speed tentatively determined by the camera microcomputer 1101 (based on the exposure time set by the camera microcomputer 1101 based on the photometry value obtained by photometry).

In step S1109, the ICPU 1112 corrects the normal photometry value BV acquired in step S1103 by using equation (10) given below. Letting BV_FLK be a photometry value after correction and BV_FLK_com_* be the photometry correction value selected in step S1107 or S1108, $$BV\_FLK = BV + BV\_FLK\_\text{com}\_* \quad (10)$$

With that, the photometric value determination processing when performing shooting with the reduced influence of flicker is terminated.

The camera microcomputer 1101 determines exposure control values to be used for shooting based on the photometry value corrected in this manner.

As described above, correcting a photometry value in accordance with a shutter speed makes it possible to reduce photometry errors caused by the influence of flicker and acquire a proper image with the reduced influence of flicker.

Note that this embodiment has exemplified some shooting modes selected by the user. However, the embodiment may be applied to other modes as long as procedures are classified according to a condition whether a shutter speed can be determined in advance by user selection.

Third Embodiment

The third embodiment of the present invention will be described next. This embodiment differs from the second embodiment in that a photometry correction value is calculated by predicting the waveform of a flicker light source by approximation based on photometry values for flicker detection. Detailed descriptions of points common to the image capturing apparatus according to the second embodiment will be omitted, and a method of calculating a photometry correction value, which is a different point, will be mainly described below.

Figure 12:
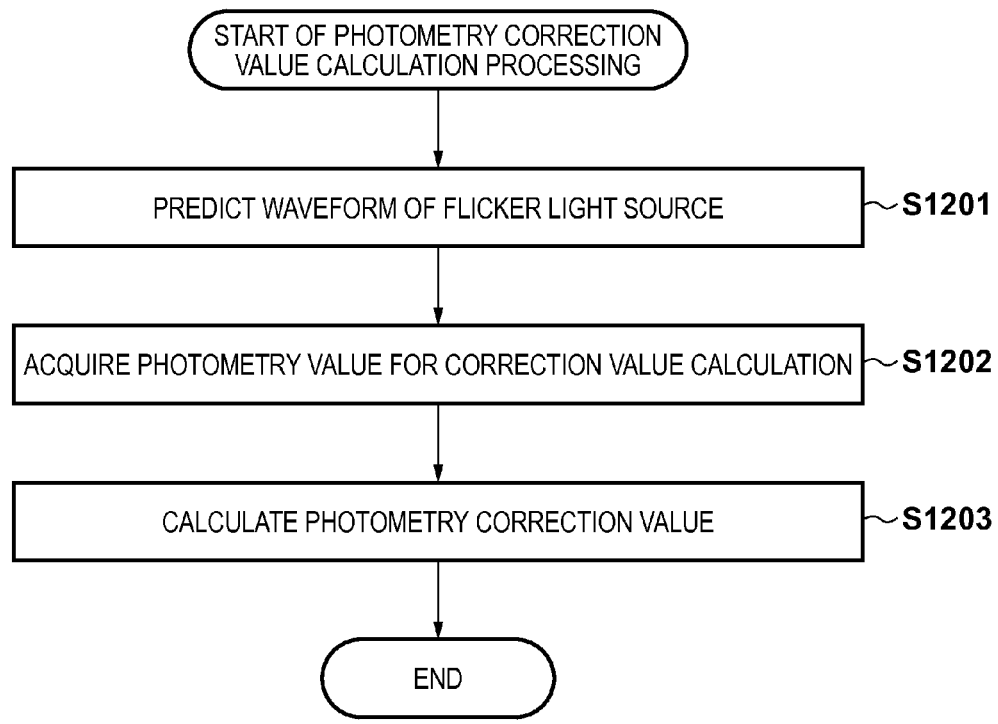
FIG. 12 is a flowchart showing a method of calculating a photometry correction value according to the second embodiment.

FIG. 12 is a flowchart for a method of calculating a photometry correction value according to this embodiment. FIGS. 13A to 13E are schematic views showing an example of the method of calculating a photometry correction value by using flicker light source waveform prediction by approximation. The method of calculating a photometry correction value according to this embodiment will be described with reference to FIGS. 12 and 13A to 13E. Note that the flowchart shown in FIG. 12 is executed following flicker detection computation in step S1105 in FIG. 7.

In step S1201, an ICPU 1112 predicts the waveform of a flicker light source based on a plurality of photometry values obtained by the same method as that used in steps S1104 and S1105.

Figure 13A:
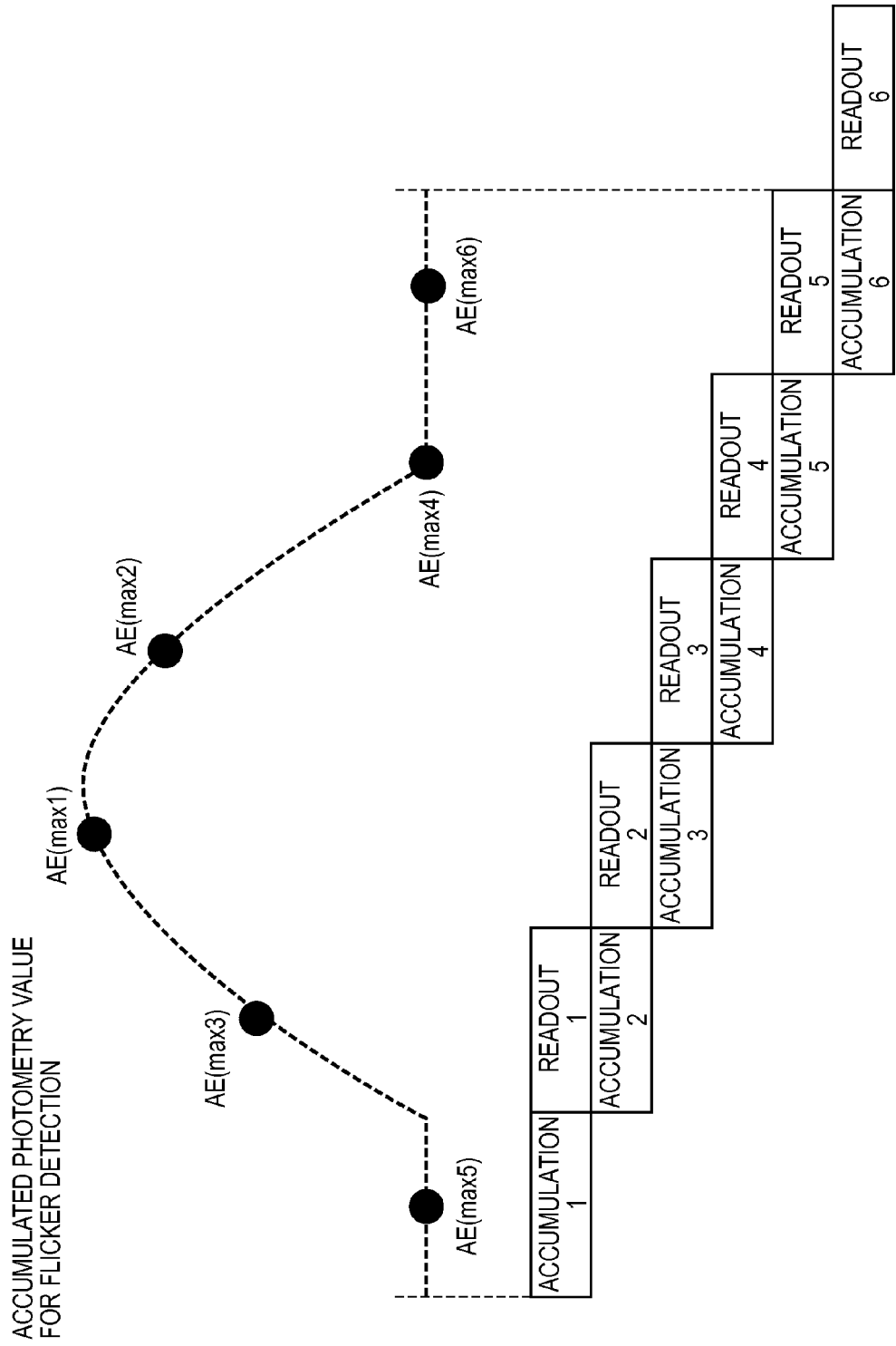

First of all, as shown in FIG. 13A, the plurality of photometry values obtained in one light amount variation cycle or more of the flicker light source are AE(max1), AE(max2), AE(max3), AE(max4), AE(max5), and AE(max6) in descending order.

As shown in FIG. 13B, AE(max6)' is interpolated at the timing of t=0 such that AE(max6)' to AE(max6) constitute one cycle. The waveform of the flicker light source is predicted by approximation using the above seven points.

The waveforms of the light amounts of a fluorescent light and some LEDs will be described with reference to FIG. 17. The abscissa of FIG. 12 represents time, and the ordinate emission intensity. As shown in FIG. 17, there is only a momentary period during which the light amount becomes 0 (minimum) in one light amount variation cycle of the fluorescent light, whereas there is a continuous period during which the light amount becomes 0 (minimum) in one light amount variation cycle of the LEDs. When an approximation function for flicker detection is calculated based on a plurality of photometry values obtained with respect to a flicker light source with a period during which the light amount is constant, such as LEDs, it is highly possible that the resultant waveform will greatly differ from that of an actual flicker light source. In this embodiment, therefore, in order to cope with also a flicker light source in which there is a period during which the light amount is constant, one light amount variation cycle is divided into a plurality of sections, and approximation is performed in each divided section, thereby predicting the waveform of the flicker light source.

Figure 13C:
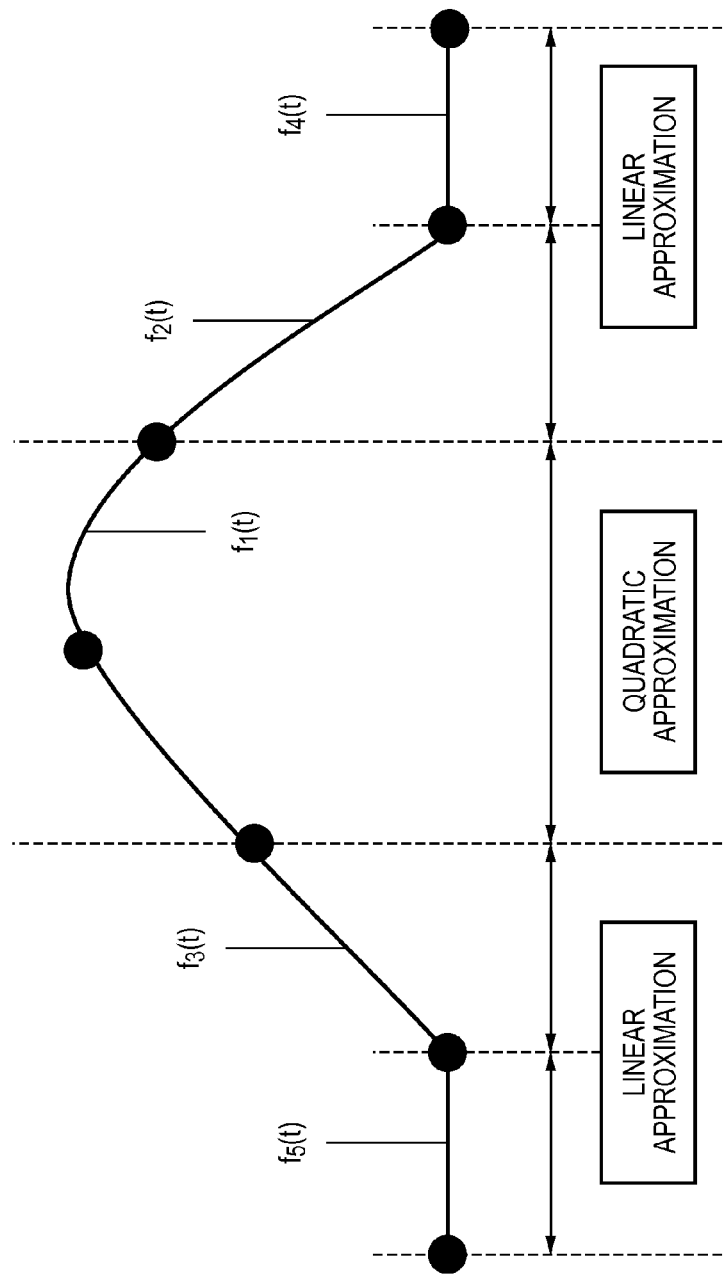

For example, as shown in FIG. 13C, quadratic function approximation is performed by using upper three points, and linear approximation is performed by using two adjacent points in other ranges, thereby predicting the waveform of the flicker light source.

Figure 13D:
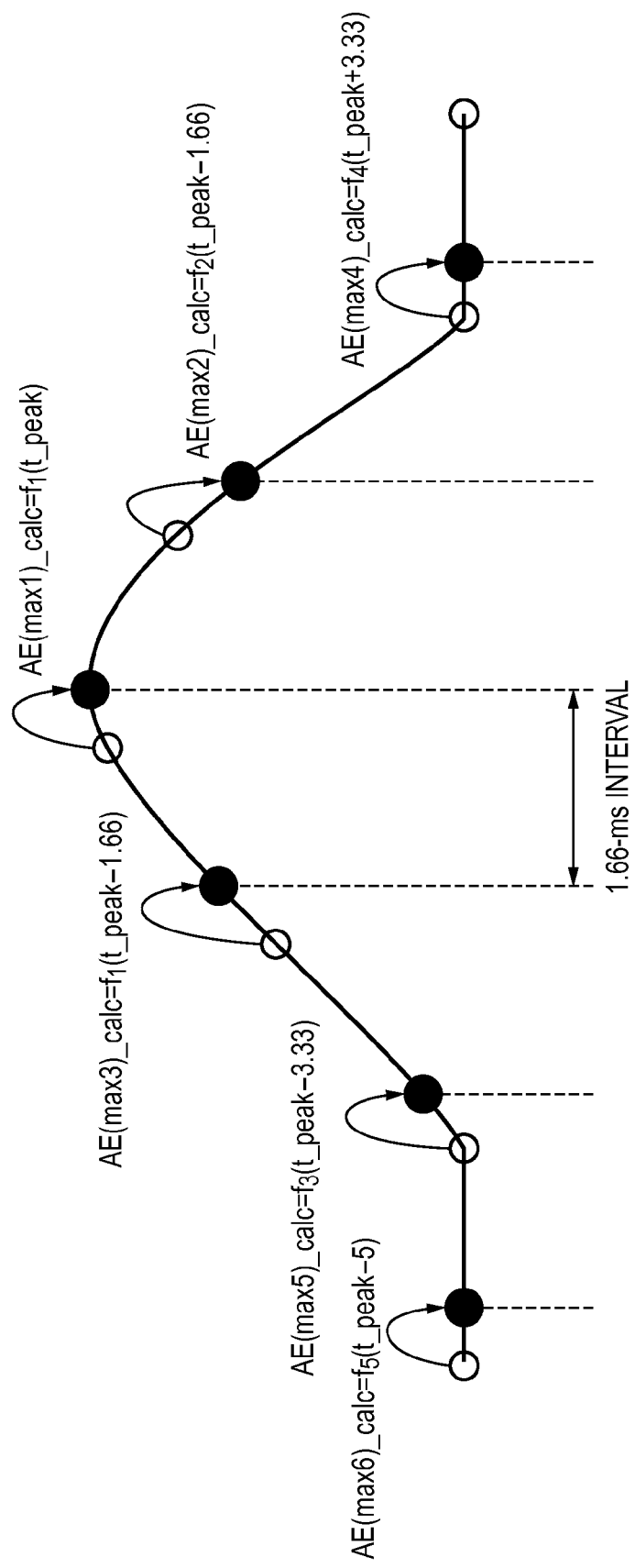

In this case, the quadratic approximation expression obtained by AE(max1), AE(max2), and AE(max3) is represented by f1(t), and the other linear approximation expressions are represented by f2(t), f3(t), f4(t), and f5(t) in descending order of the photometry values to be used. With this operation, the waveform of the flicker light source is approximated by f5(t) in the section of $0 \text{ ms} \leq t < 1.66 \text{ ms}$ f3(t) in the section of $1.66 \text{ ms} \leq t < 3.33 \text{ ms}$ f1(t) in the section of $3.33 \text{ ms} \leq t < 6.66 \text{ ms}$ f2(t) in the section of $6.66 \text{ ms} \leq t < 8.33 \text{ ms}$ f4(t) in the section of $8.33 \text{ ms} \leq t \leq 10 \text{ ms}$ In step S1202, the ICPU 1112 obtains a photometry value used for the calculation of a photometry correction value. As shown in FIG. 13D, the ICPU 1112 obtains a photometry value used for the calculation of a photometry correction value based on the above approximation expression.

The calculation photometry values obtained by the approximation expressions are represented by AE (max1)_calc, AE (max2)_calc, AE (max3)_calc, AE(max4)_calc, AE(max5)_calc, and AE(max6)_calc. These calculation photometry values are obtained by using t_peak obtained by the above approximation expressions and the same method as that used in step S1105 according to equations (11) to (21) given below. When $t\_peak \geq 5.0 \text{ ms}$, $$AE(\text{max1})\_\text{calc} = f1(t\_\text{peak}) \quad (11)$$

$$AE(\text{max2})\_\text{calc} = f2(t\_\text{peak} - 1.66) \quad (12)$$

$$AE(\text{max1})\_\text{calc} = f3(t\_\text{peak} + 1.66) \quad (13)$$

$$AE(\text{max4})\_\text{calc} = f4(t\_\text{peak} - 3.33) \quad (14)$$

$$AE(\text{max5})\_\text{calc} = f5(t\_\text{peak} + 3.33) \quad (15)$$

$$AE(\text{max6})\_\text{calc} = f6(t\_\text{peak} - 5.00) \quad (16)$$

When t_peak<5.0 ms, $$AE(\text{max1})\_\text{calc} = f1(t\_\text{peak}) \quad (11)$$

$$AE(\text{max2})\_\text{calc} = f2(t\_\text{peak} + 1.66) \quad (17)$$

$$AE(\text{max1})\_\text{calc} = f3(t\_\text{peak} - 1.66) \quad (18)$$

$$AE(\text{max4})\_\text{calc} = f4(t\_\text{peak} + 3.33) \quad (19)$$

$$AE(\text{max5})\_\text{calc} = f5(t\_\text{peak} - 3.33) \quad (20)$$

$$AE(\text{max6})\_\text{calc} = f6(t\_\text{peak} + 5.00) \quad (21)$$

Figure 13E:
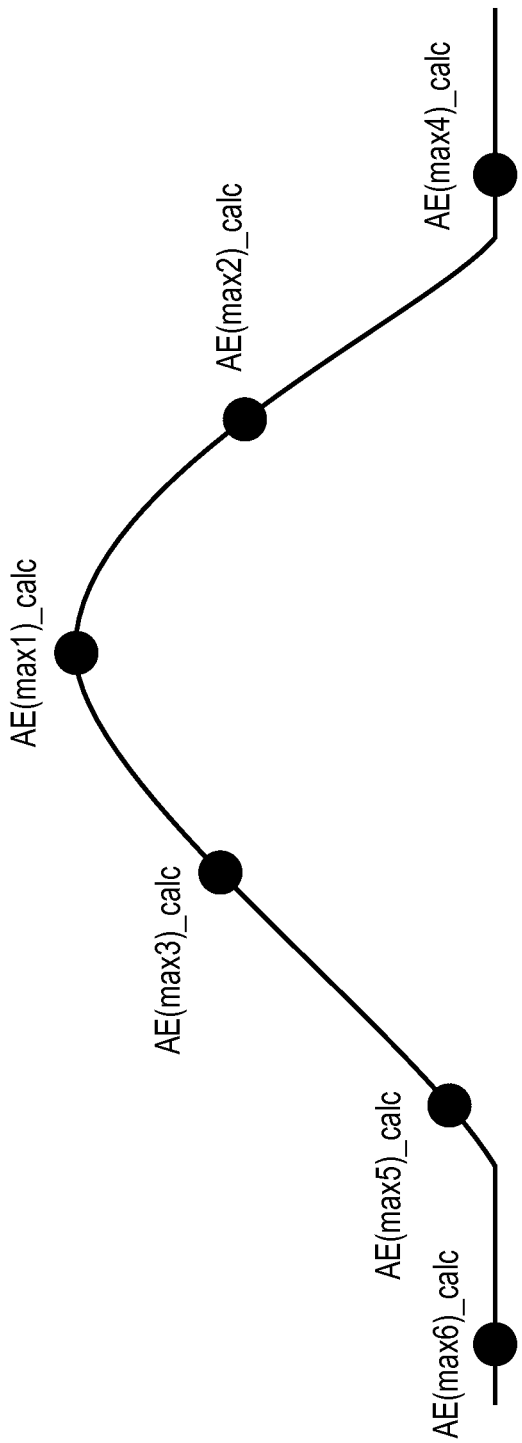

With this operation, as shown in FIG. 13E, photometry values are obtained at 1.66 ms intervals with reference to the timing of the peak of the light amount of the flicker. In this case, it is possible to increase the number of calculation photometry values in the respective sections by shortening the interval for the calculation of calculation photometry values to a time shorter than 1.66 ms.

Subsequently, in step S1203, the ICPU 1112 calculates a photometry correction value. First of all, the ICPU 1112 calculates an average photometry value FLK_AE_average in one light amount variation cycle of the flicker light source by using equation (22) or (23) given below. When the frequency of the light source is 100 Hz, $$FLK\_AE\_\text{average} = \Sigma_{n=1}^{6} AE(\text{max}(n)\_\text{calc})/6 \quad (22)$$

When the frequency of the light source is 120 Hz, $$FLK\_AE\_\text{average} = \Sigma_{n=1}^{5} AE(\text{max}(n)\_\text{calc})/5 \quad (23)$$

The ICPU 1112 then calculates photometry correction values corresponding to shutter speeds by using equations (24) to (28).

A photometry correction value (BV_FLK_com_500) used when $1/8000 \leq TV \leq 1/500$ is obtained by equation (24):

$$(BV\_FLK\_\text{com}\_500) = AE(\text{max1})\_\text{calc} - FLK\_AE\_\text{average} \quad (24)$$

A photometry correction value (BV_FLK_com_250) used when $1/500 < TV \leq 1/250$ is obtained by equation (25):

$$(BV\_FLK\_\text{com}\_250) = \{AE(\text{max1})\_\text{calc} + AE(\text{max2})\_\text{calc}\}/2 - FLK\_AE\_\text{average} \quad (25)$$

A photometry correction value (BV_FLK_com_200) used when $1/250 < TV \leq 1/200$ is obtained by equation (26):

$$(BV\_FLK\_\text{com}\_200) = \{AE(\text{max1})\_\text{calc} + AE(\text{max2})\_\text{calc} + AE(\text{max3})\_\text{calc}\}/3 - FLK\_AE\_\text{average} \quad (26)$$

A photometry correction value (BV_FLK_com_1600) used when $1/200 \leq TV \leq 1/160$ is obtained by equation (27):

$$(BV\_FLK\_\text{com}\_160) = \{AE(\text{max1})\_\text{calc} + AE(\text{max2})\_\text{calc} + AE(\text{max3})\_\text{calc} + AE(\text{max4})\_\text{calc}\}/4 - FLK\_AE\_\text{average} \quad (27)$$

A photometry correction value (BV_FLK_com_125) used when $1/160 \leq TV \leq 1/125$ is obtained by equation (28):

$$(BV\_FLK\_\text{com}\_125) = \{AE(\text{max1})\_\text{calc} + AE(\text{max2})\_\text{calc} + AE(\text{max3})\_\text{calc} + AE(\text{max4})\_\text{calc} + AE(\text{max5})\_\text{calc}\}/5 - FLK\_AE\_\text{average} \quad (28)$$

Photometry correction value selection processing, photometry value correction processing, and exposure control value determination processing to be subsequently performed are the same as those in the first embodiment, and hence a description of them will be omitted.

Figure 14:
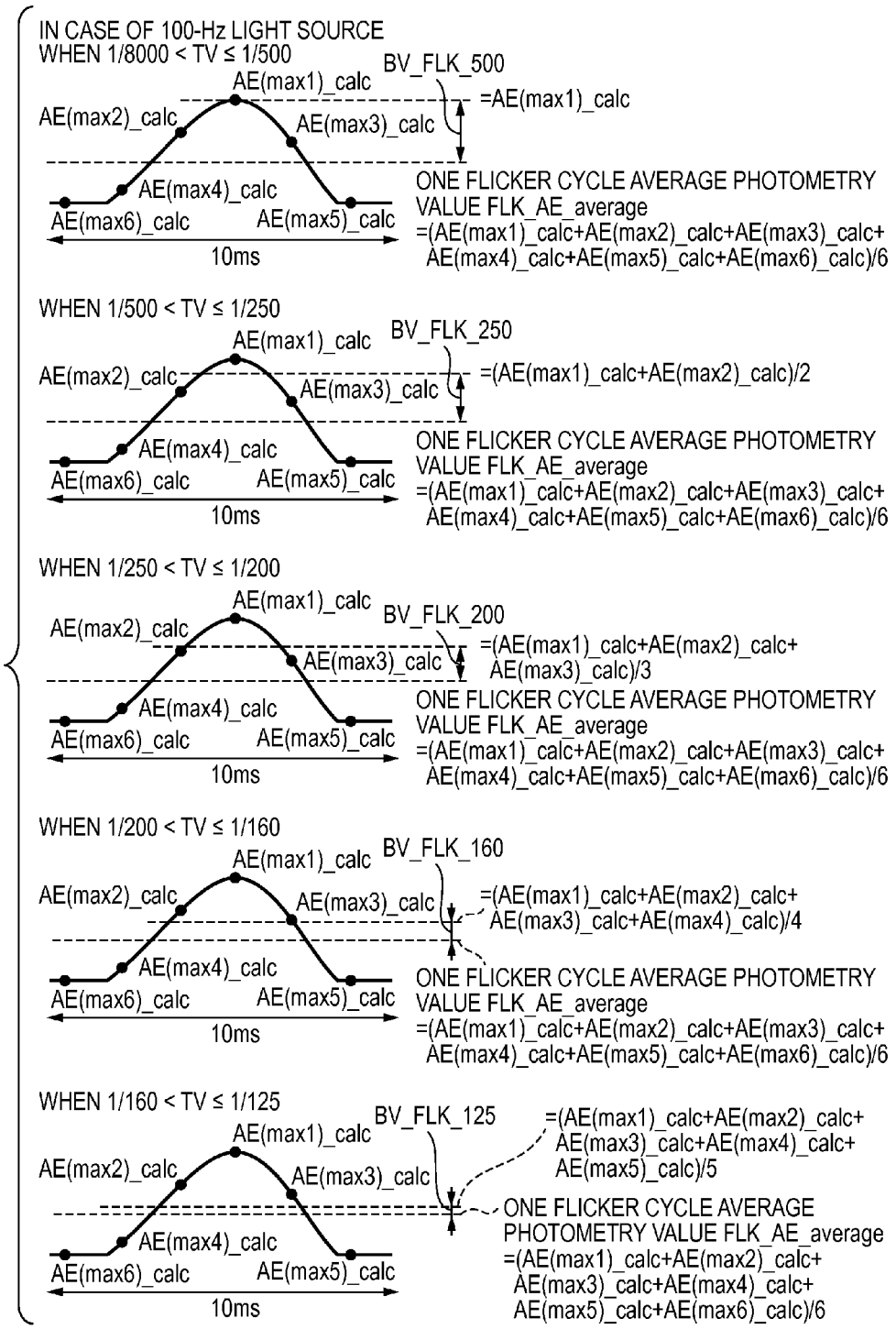
FIG. 14 is a view showing the relationship between shutter speeds and photometry values corrected by photometry correction values according to the second embodiment.

FIG. 14 shows the relationship between the respective shutter speeds and the photometry values corrected by the photometry correction values. In this embodiment, one light amount variation cycle of a flicker light source is divided into a plurality of sections, and an approximation expression is calculated for each section, thereby predicting the waveform of the flicker light source. In addition, since calculation photometry values for the calculation of photometry correction values are obtained with reference to the timing of the peak of the light amount of the flicker by using the predicted waveform, photometry values can be corrected in accordance with shutter speeds more accurately than in the first embodiment, as shown in FIG. 9.

As described above, in this embodiment, it is possible to reduce photometry errors caused by the influence of flicker and obtain a proper image with the reduced influence of the flicker regardless of the waveform of the flicker light source.

Fourth Embodiment

The fourth embodiment of the present invention will be described next. This embodiment differs from the second and third embodiments in that it predicts the waveform of a flicker light source by approximation based on photometry values for flicker detection when calculating photometry correction values, and computes photometry correction values by integrating the approximation expressions by times corresponding to shutter speeds. Detailed descriptions of points common to the image capturing apparatuses according to the second and third embodiments will be omitted, and a method of calculating a photometry correction value, which is a different point, will be mainly described below.

Figure 15:
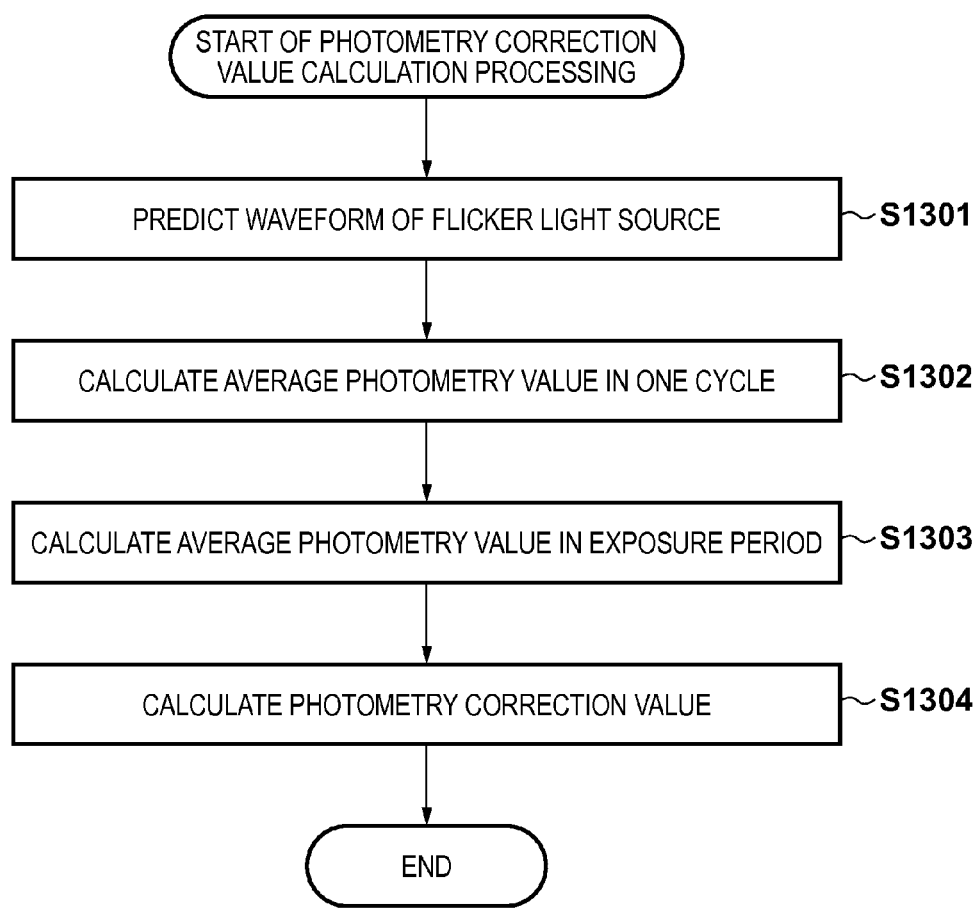
FIG. 15 is a flowchart for a method of calculating a photometry correction value according to the third embodiment.

FIG. 15 is a flowchart for a method of calculating a photometry correction value according to this embodiment. FIGS. 16A to 16E are schematic views showing an example of the method of calculating a photometry correction value by using flicker light source waveform prediction by approximation. The method of calculating a photometry correction value according to this embodiment will be described with reference to FIGS. 15 and 16A to 16E. Note that the flowchart shown in FIG. 15 is executed following flicker detection computation in step S1105 in FIG. 7.

In step S1301, an ICPU 1112 predicts the waveform of a flicker light source based on a plurality of photometry values obtained by the same method as that used in steps S1104 and S1105.

Figure 16A:
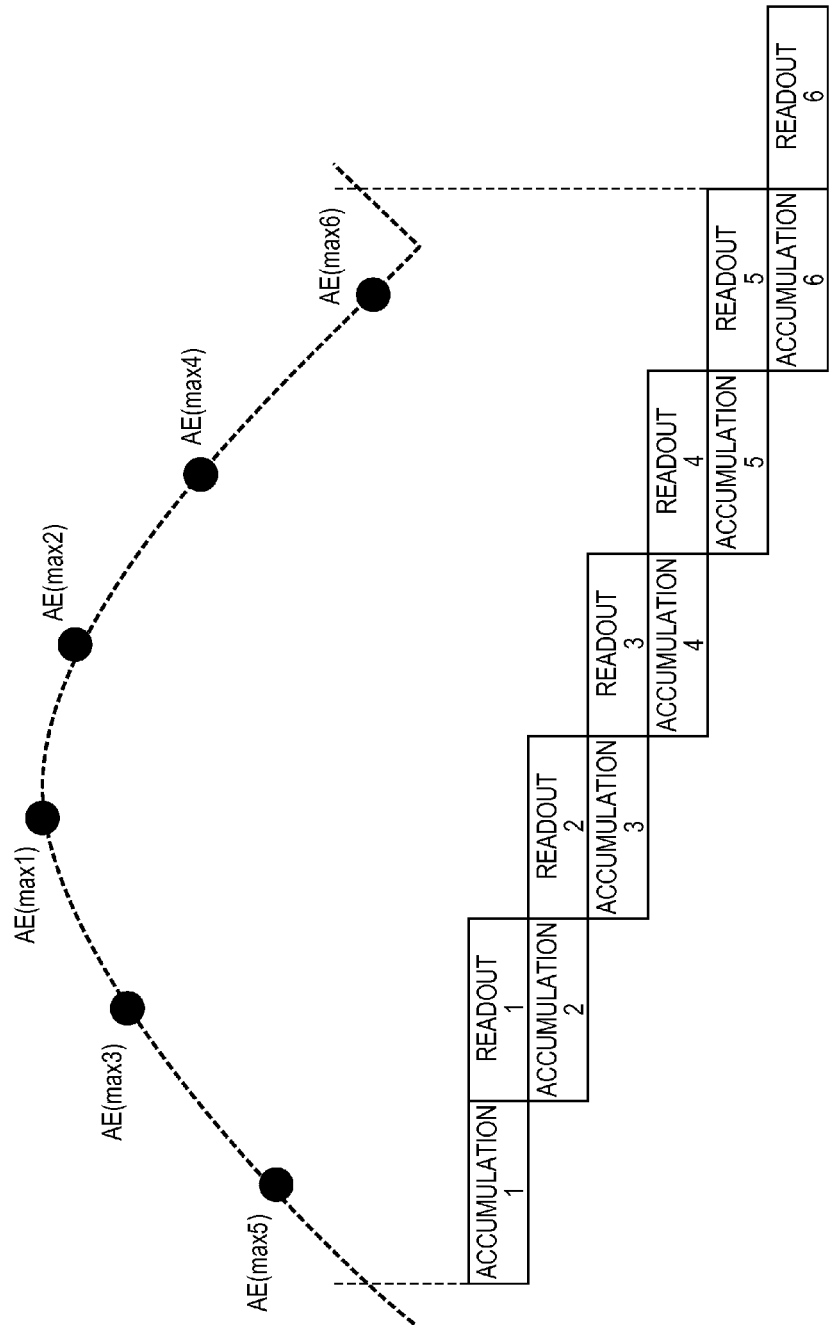
Figure 16B:
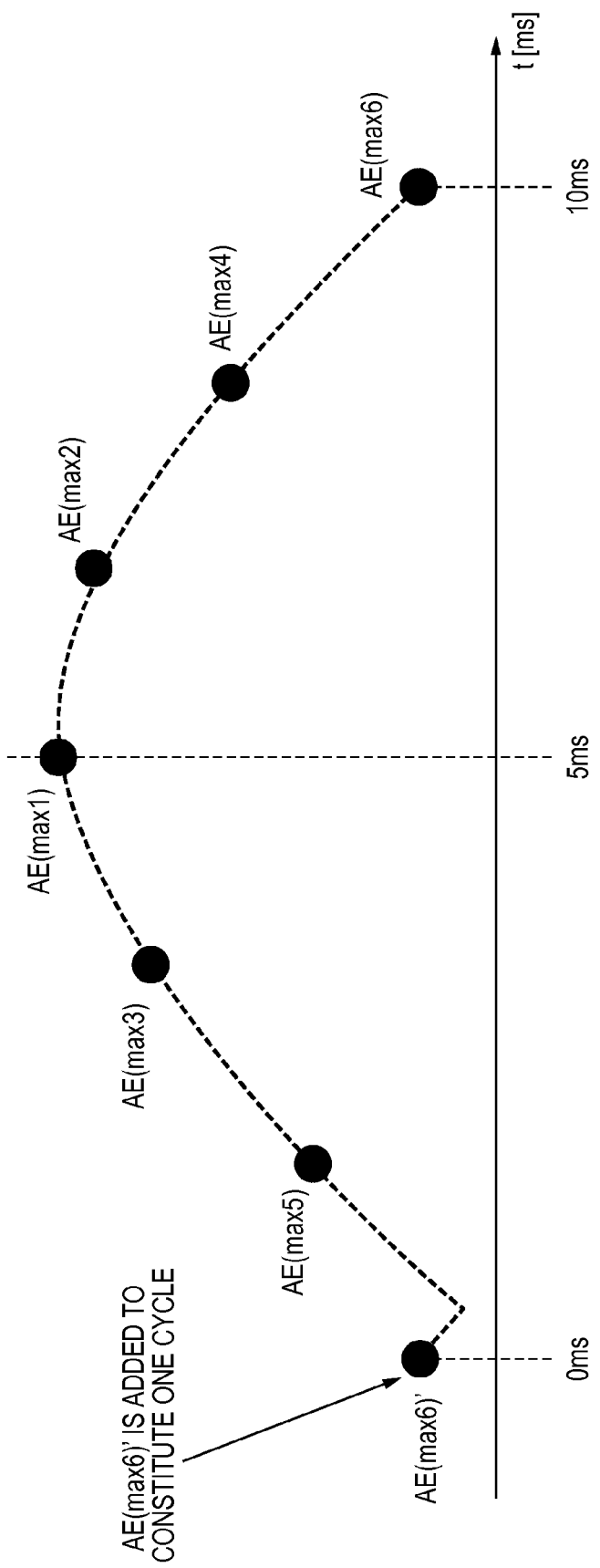
Figure 16D:
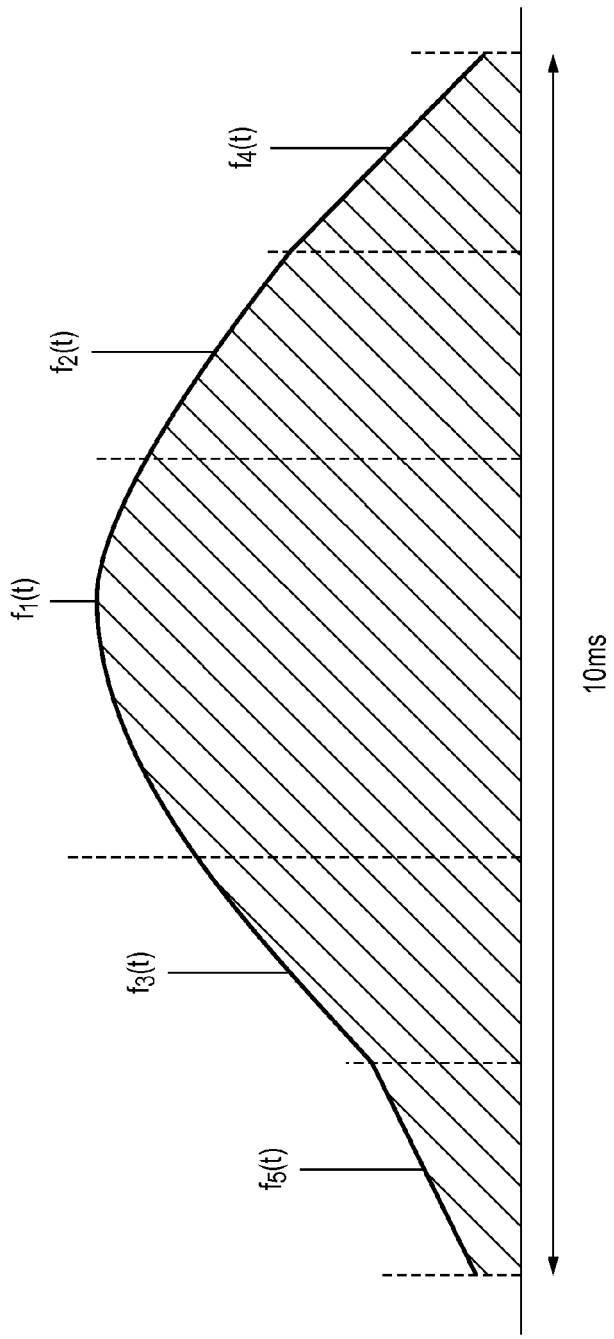
Figure 18:
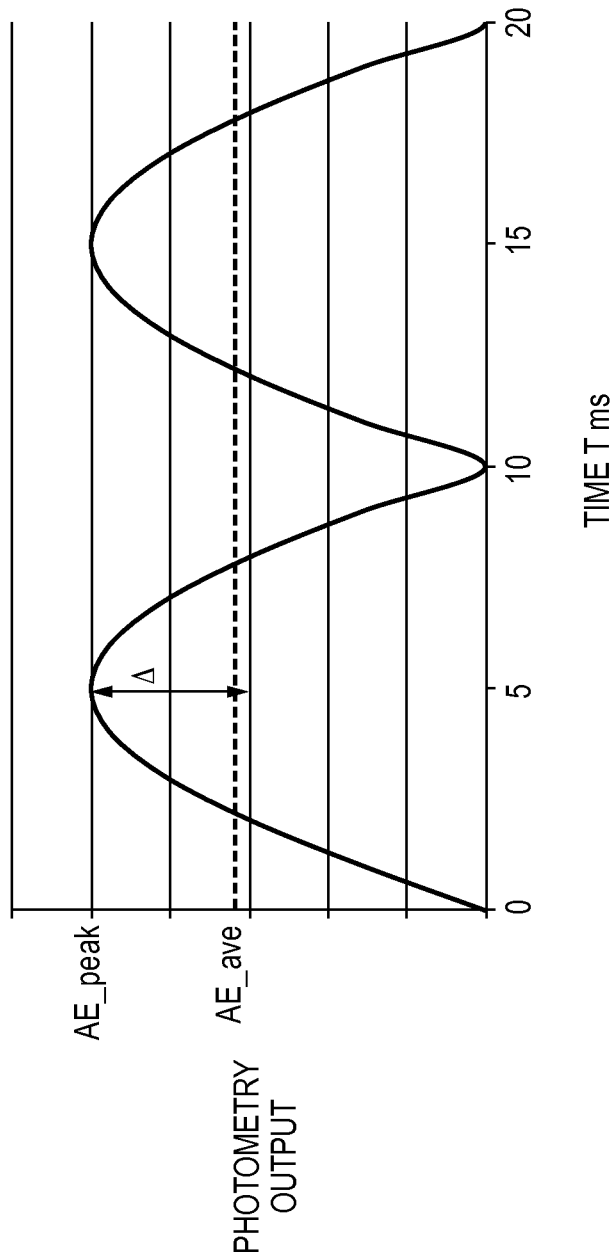
FIG. 18 is a graph representing photometry values obtained in a flicker environment.

First of all, as shown in FIG. 16A, the plurality of photometry values obtained in one light amount variation cycle or more of the flicker light source are AE(max1), AE(max2), AE(max3), AE(max4), AE(max5), and AE(max6) in descending order.

AE(max6)' is then interpolated at the timing of t=0 such that AE(max6)' to AE (max6) constitute one cycle by the same method as that in FIG. 13B. The waveform of the flicker light source is predicted by approximation using the above seven points.

As in the third embodiment, quadratic function approximation is performed by using upper three points, and linear approximation is performed by using two adjacent points in other ranges, thereby predicting the waveform of the flicker light source. In this case, the quadratic approximation expression obtained by AE(max1), AE(max2), and AE(max3) is represented by f1(t), and the other linear approximation expressions are represented by f2(t), f3(t), f4(t), and f5(t) in descending order of the photometry values to be used. With this operation, as shown in FIG. 11, the waveform of the flicker light source is approximated by f5(t) in the section of 0 ms≤t<1.66 ms
f3(t) in the section of 1.66 ms≤t<3.33 ms
f1(t) in the section of 3.33 ms≤t<6.66 ms
f2(t) in the section of 6.66 ms≤t<8.33 ms
f4(t) in the section of 8.33 ms≤t≤10 ms In step S1302, the ICPU 1112 then calculates an average photometry value FLK_AE_average in one light amount variation cycle of the flicker light source by using equation (29) or (30) given below. When the frequency of the light source is 100 Hz, $$\text{FLK\_AE\_average} = \left( \int_0^{1.66} f_5(t)dt + \int_{1.66}^{3.33} f_3(t)dt + \int_{3.33}^{6.66} f_1(t)dt + \int_{6.66}^{8.33} f_2(t)dt + \int_{8.33}^{10} f_4(t)dt \right) \div 10 \quad (29)$$

When the frequency of the light source is 120 Hz, $$\text{FLK\_AE\_average} = \quad (30)$$
$$\left( \int_0^{1.66} f_5(t)dt + \int_{1.66}^{3.33} f_3(t)dt + \int_{3.33}^{6.66} f_1(t)dt + \int_{6.66}^{8.33} f_2(t)dt \right) \div 8.33$$

In step S1303, the ICPU 1112 then calculates an average photometry value in an exposure period corresponding to a shutter speed by integrating an approximation expression by a time corresponding to the shutter speed. In this case, the middle of the integration interval is obtained as t_peak by the same method as that in step S1105 described above. Letting FLK_AE_ex be an average photometry value corresponding to a shutter speed, $$\text{FLK\_AE\_ex} = \int_{t\_peak - t\_ex/2}^{t\_pawk + e\_ex/2} f(t)dt \div t_{ex} \quad (31)$$

where f(t) is an approximation expression representing the waveform of the flicker light source, and t_ex is a shutter speed.

A method of calculating photometry values when the shutter speed is 1/200 will be described as an example.

FIG. 16E is a graph showing an integration to obtain a photometry value when the shutter speed is 1/200. Letting FLK_AE_200 be a photometry value when the shutter speed is 1/200, the photometry value is obtained by equation (32) given below.

$$\text{FLK\_AE\_200} = \int_{t\_peak-2.5}^{t\_pawk-2.5} f(t)dt \div 5 \quad (32)$$

In this embodiment, since the waveform of a flicker light source is divisionally approximated, an integration is also divisionally performed as indicated by equation (33) given below.

$$FLK\_AE\_200 = (\int f_3(t)dt + \int f_1(t)dt + \int f_2(t)dt) \div 5 \quad (33)$$

In this case, integral values in the respective integration intervals are obtained in accordance with the value of t_peak by equations (34) to (36).

$$\int f_3(t)dt = \begin{cases} 0 & (t\_peak - 2.5 \geq 3.33) \\ \int_{t\_peak-2.5}^{3.33} f_3(t)dt & (t\_peak - 2.5 < 3.33) \end{cases} \quad (34)$$

$$\int f_1(t)dt = \quad (35)$$
$$\begin{cases} \int_{t\_peak-2.5}^{6.66} f_1(t)dt & (t\_peak - 2.5 > 3.33) \\ \int_{3.33}^{t\_peak+2.5} f_1(t)dt & (t\_peak + 2.5 < 6.66) \\ \int_{3.33}^{6.66} f_1(t)dt & (t\_peak - 2.5 \leq 3.33 \text{ and } t\_peak + 2.5 \geq 6.66) \end{cases}$$

$$\int f_2(t)dt = \begin{cases} 0 & (t\_peak + 2.5 \leq 6.66) \\ \int_{t\_peak-2.5}^{3.33} f_2(t)dt & (t\_peak + 2.5 > 6.66) \end{cases} \quad (36)$$

In step S304, the ICPU 1112 calculates a photometry correction value corresponding to a shutter speed by using equation (37).

$$BV\_FLK\_com\_***=FLK\_AE\_ex-FLK\_AE\_average \quad (37)$$

Photometry correction value selection processing, photometry value correction processing, and exposure control value determination processing to be subsequently performed are the same as those in the second embodiment, and hence a description of them will be omitted.

As described above, in this embodiment, one light amount variation cycle of a flicker light source is divided into a plurality of sections, and an approximation expression is calculated for each section, thereby predicting the waveform of the flicker light source. In addition, since a photometry correction value is computed by integrating each approximation expression by a time corresponding to a shutter speed, a photometry value can be corrected more accurately in accordance with the shutter speed than in the second and third embodiments.

The above embodiment has exemplified the case in which the light amount variation frequency of a flicker light source is 100 Hz. When the light amount variation frequency of a flicker light source is 120 Hz, similar computation may be performed by using five photometry values for flicker detection.

In addition, the above embodiment has exemplified the case in which accumulation and readout operation for flicker detection are performed after accumulation and readout operation for normal photometry. However, the execution order is not specifically limited, and accumulation and readout operation for flicker detection may be performed first.

The above embodiment has exemplified the case in which exposure is performed in accordance with the timing at which the light amount of a flicker light source becomes maximum, as an example of performing exposure at the timing set based on the light amount variation characteristics of light from an object, in order to perform shooting with the reduced influence of flicker. However, exposure may be performed at another timing as long as it is possible to perform shooting with the reduced influence of flicker. For example, in a case with a light source, such as an LED shown in FIG. 17, with a predetermined period during which the light amount of a flicker light source continues to be minimum, even if exposure is performed in accordance with the timing at which the light amount of the flicker light source becomes minimum, it is possible to perform shooting with the reduced influence of flicker. Alternatively, in a case with a light source whose light amount variation gradually changes from a decrease to an increase, even if there is no period during which the light amount becomes constant, it is possible to perform shooting with the reduced influence of flicker even when performing exposure in accordance with the timing at which the light amount becomes minimum as well as the timing at which the light amount becomes maximum.

Furthermore, in the above embodiment, the ICPU 1112 performs photometry and calculates the light amount variation characteristics of light from an object based on output signals (image signals) from the photometry sensor 1108. However, the embodiment may separately include a sensor for photometry and a sensor for the calculation of light amount variation characteristics.

According to the above embodiment, it is possible to provide an image capturing apparatus which can perform shooting with proper exposure regardless of the presence/absence of a flicker light source.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240252, filed Nov. 20, 2013, and 2014-104495, filed May 20, 2014, which are hereby incorporated by reference herein in their entirety.

What is claimed is:

1. An image capturing apparatus comprising:
an image sensor;
a processor programmed to operate as the following units;
a first calculation unit configured to calculate a first photometric value;
a setting unit configured to set a first exposure time of the image sensor based on the first photometric value;
a detection unit configured to detect a periodical light amount variation characteristics of ambient light;
a correction unit configured to correct the first photometric value to generate a second photometric value based on a relationship between the first exposure tune set by the setting unit and the periodical light amount variation characteristics detected by the detection unit; and
an exposure condition determination unit configured to determine exposure condition when performing an exposure of the image sensor at a predetermined timing of the light amount variation detected by the detection unit, based on the second photometric value generated by the correction unit.

2. The apparatus according to claim 1, wherein the correction unit corrects the first photometric value so as to increase the second photometric value as an exposure time set by said setting unit is shortened.

3. The apparatus according to claim 1, wherein the detection unit detects the light amount variation characteristics by periodically obtaining a plurality of photometric values.

4. The apparatus according to claim 1,
wherein the first calculation unit calculates the first photometric value by obtaining a signal from the image sensor charge accumulation period of which corresponds to at least one cycle of the periodical light amount variation.

5. The apparatus according to claim 3,
wherein the detection unit detects the light amount variation characteristics by the periodically obtaining a plurality of the photometric value each of which corresponds to an accumulation period of 1.66 msec.

6. The apparatus according to claim 1,
wherein the second photometric value is larger than the first photometric value.

7. A method of controlling an image capturing apparatus including an image sensor, the method comprising:
a first calculation step of calculating a first photometric value;
a setting step of setting an exposure time of the image sensor based on the first photometric value;
a detection step of detecting a periodical light amount variation characteristics of ambient light;
a correction step of correcting a first photometric value to generate a second photometric value based on a relationship between the first exposure time set by the setting step and the periodical light amount variation characteristics detected by the detection step; and
an exposure condition determination step of determining an exposure condition when performing an exposure of the image sensor at a predetermined timing of the light amount variation detected by the detection step, based on the second photometric value generated by the correction step.

8. A non-transitory storage medium storing a program for causing a computer to execute each step of a control method defined in claim 7.

* * * * *